(12) United States Patent
Burkitt et al.

(10) Patent No.: US 8,769,576 B2
(45) Date of Patent: Jul. 1, 2014

(54) SYSTEM AND METHOD FOR REAL-TIME PROCESSING, STORAGE, INDEXING, AND DELIVERY OF SEGMENTED VIDEO

(75) Inventors: Kevin J. Burkitt, Palo Alto, CA (US); Eoin G. Dowling, Palo Alto, CA (US); Trevor R. Branon, San Francisco, CA (US)

(73) Assignee: Mixaroo, Inc., Palo Alto, CA (US)

( * ) Notice: Subject to any disclaimer, the term of this patent is extended or adjusted under 35 U.S.C. 154(b) by 38 days.

(21) Appl. No.: 13/436,973

(22) Filed: Apr. 1, 2012

(65) Prior Publication Data

US 2012/0254917 A1    Oct. 4, 2012

Related U.S. Application Data

(60) Provisional application No. 61/470,818, filed on Apr. 1, 2011.

(51) Int. Cl.
*G06F 3/00* (2006.01)
*G06F 13/00* (2006.01)
*H04N 5/445* (2011.01)

(52) U.S. Cl.
USPC ................................. 725/40; 725/46; 725/53

(58) Field of Classification Search
USPC ............................................. 725/40, 46, 53
See application file for complete search history.

(56) References Cited

U.S. PATENT DOCUMENTS

| | | | |
|---|---|---|---|
| 2004/0025180 A1* | 2/2004 | Begeja et al. | 725/46 |
| 2007/0113255 A1 | 5/2007 | Kurosawa | |
| 2009/0254562 A1 | 10/2009 | Casaccia | |
| 2010/0138859 A1* | 6/2010 | Ko | 725/37 |
| 2010/0303436 A1 | 12/2010 | Chang et al. | |
| 2010/0333137 A1* | 12/2010 | Hamano et al. | 725/39 |
| 2012/0066073 A1* | 3/2012 | Dilip et al. | 705/14.66 |

OTHER PUBLICATIONS

International Search Report and Written Opinion issued Oct. 12, 2012 in International Application No. PCT/US2012/013777 (8 pages).
International Search Report and Written Opinion issued Oct. 12, 2012, in International Application No. PCT/US2012/031777 (8 pages).

* cited by examiner

*Primary Examiner* — Nnenna Ekpo
(74) *Attorney, Agent, or Firm* — Baker & McKenzie LLP

(57) ABSTRACT

Disclosed embodiment providing for the capture of video content. The video content is segmented in real-time into clips by topic, and those clips are delivered as customized queues of video items relevant to the consumer according to their interests as aggregated from their social graph data and manual entry.

20 Claims, 10 Drawing Sheets

FIG. 10

Mixaroo — 1006

Manage Your Custom Stream — 1005

1004

LIVE | Capitol Hill
21:11 Local

BREAKING NEWS
US STATE OF THE UNION
President Obama delivers address for second time Tweet   Share BBC News 24: State of the Union Speech

1001

Trending
State of the Union
Thundercats
Moscow
Wikileaks
Arizona
Tunisia
Floods
Google Interactive Transcript Only in Washington can you be watching the State of the Union with a member of another party. In the light of the Arizona or shootings there is a realization that Americans are fed up with the tone of the debate.

The partisanship we saw immediately after the shootings is not something that the American public feels comfortable with. So they have decided to team up one Republican with one Democrat and have them sit together...

That is the theme of the night. Both sides, at least for an evening, will try to find common ground. Obamas speech is shot through with testimonials to compromise and working together. He has been doing that since the election.

He has brought corporate executives into the White House. He is channelling Ronald Reagan. The legacy of the Tucson shootings a few weeks ago.

Almost every one of the Cabinet members are is wearing black and white ribbons on their lapels in deference to what happened in Tucson.

To what extent Katty are we seeing the effects of Tucson? Promises of bipartisanship Barres and as apple pie and ice cream. And usually the promise expires after 32 seconds.

Partisanship is more the norm in Washington. Tonight everyone is making a big effort. There will be the empty seat of congresswoman Gabrielle Giffords.

She is not dead tonight but there will be an empty seat for her and the President will PGY pay tribute to her. The promise of this partisanship staying will be whether the parties decide it is in their best interest.

Custom TV
Discover
Shared 1002, 1003

Rickie Gervais Golden Globe Scandal | Liverpool vs Man U highlights | Audi R8 reviewed in Top Gear | Muse Live at the Channel 4 Music Awards | TRON — Tron reviewed on the Culture Show | Oscar Award Nominations

SYSTEM AND METHOD FOR REAL-TIME PROCESSING, STORAGE, INDEXING, AND DELIVERY OF SEGMENTED VIDEO

CROSS-REFERENCE TO RELATED APPLICATION

This application claims priority to U.S. Provisional Application No. 61/470,818, filed on Apr. 1, 2011, entitled "Real-Time Delivery of Segmented Video," which is incorporated herein by reference in its entirety.

TECHNICAL FIELD

The present disclosure relates generally to systems and methods that provide for indexing, storage, and access to video broadcasts.

BACKGROUND

Broadcast television is a constantly changing medium with linear programming schedules. Multiple forms of recording devices exist to satisfy a consumer's need to record selected programming at their own convenience, but these require consumers to know in advance what programming they want to record. Programming that has not been recorded cannot be viewed later.

Broadcast television is localized by satellite, cable, or antenna coverage. Even though content partnership between networks is common, the delivery is still regional.

Internet Protocol television (IPTV) 202 solutions are emerging to deliver content 'on demand' by exploiting the internet as a global delivery medium, but the large cost of bandwidth and streaming services for long form content delivery, coupled with licensing costs and restrictions, hampers wide scale distribution.

There is also an infrastructure and development cost to create such a delivery platform. These costs mean that a company must have either large-scale user numbers, or premium content must be introduced to attract this audience and achieve a viable income.

User generated content sites such as YouTube have begun to attract the attention of content producers as a medium for delivery, in particular, time-sensitive content such as news broadcasts. These sites go some way to providing content to the user in a timely manner, but indexing is driven by manually generated program titles, descriptions, tags, and other processes that cause delays. For news information in particular, the absence of video content within a search engine's 'real-time results,' is an indication of a problem in this process—in particular when the story has already been aired, but a user must wait for someone else to manually add a news story in order for them to watch it later.

Video advertising remains largely rooted in its broadcast television foundations. Advertising is based largely on broad channel or program demographics rather than explicit information about a program's content. On the internet, text-based advertising such as Google Adwords, has proven to have much more value with context-sensitive advertising.

While the increasing use of mobile devices delivers an emerging base of consumers, traditional long-play program formats are poorly suited to these users and their devices. Several formats have been defined and deployed for delivery of television streams to mobile devices. These formats, such as Digital Video Broadcasting-Handheld or DVB-H, are focused on replicating the television experience on a mobile device but do not address the more common use cases for mobile devices, which favor short-form content.

SUMMARY

The systems and methods disclosed in this specification capture video content, segment the content in real time, can sort the video content into clips by topic, and can delivers those clips as a customized queue of video items relevant to users according to their interests, as determined by their social graph data and/or their manual interest profile configurations.

The disclosed systems and methods can segment long-form video content into smaller clips based on the topic of the content. This enables the generation of a searchable index of short, highly relevant video results. The created index is not only useful to the user, but also provides advertisers a deeper context against which relevant advertising can be selected.

In addition to enabling 'directed search' results for keyword lookups in the index, the disclosed systems and methods enables providing recommendations in the form of a custom video queue or other organization means. These recommendations may be based on users' interests. The catalogue of user interests is built by aggregating user input, social network graph information, and usage feedback.

Video processing may be performed in real time so that live or currently broadcasting video content is indexed as it airs. This enables the System 100 to immediately notify users through push mechanisms when relevant content is available and, where the client supports it, deliver the related video. This real-time processing also means that the content can be delivered to search engine indexes to enable real-time results with rich video content.

The index offers a rich data source for analysis and reputation management applications. As a whole, the combination of user interests, demographic information, and behaviors against sentiment aware content, forms a valuable asset for brands and advertisers.

BRIEF DESCRIPTION OF THE DRAWINGS

For a more complete understanding of the present disclosure and its advantages, reference is now made to the following description taken in conjunction with the accompanying drawings, in which like reference numbers indicate like features.

FIG. 10 is an example of a web client;

Although similar reference numbers may be used to refer to similar elements for convenience, it can be appreciated that each of the various example embodiments may be considered to be distinct variations.

The present embodiments will now be described hereinafter with reference to the accompanying drawings, which form a part hereof, and which illustrate example embodiments which may be practiced. As used in the disclosures and the appended claims, the terms "embodiment" and "example embodiment" do not necessarily refer to a single embodiment, although it may, and various example embodiments may be readily combined and interchanged, without departing from the scope or spirit of the present embodiments. Furthermore, the terminology as used herein is for the purpose of describing example embodiments only, and are not intended to be limitations. In this respect, as used herein, the term "in" may include "in" and "on," and the terms "a," "an" and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated listed items.

DETAILED DESCRIPTION

Figure 1:
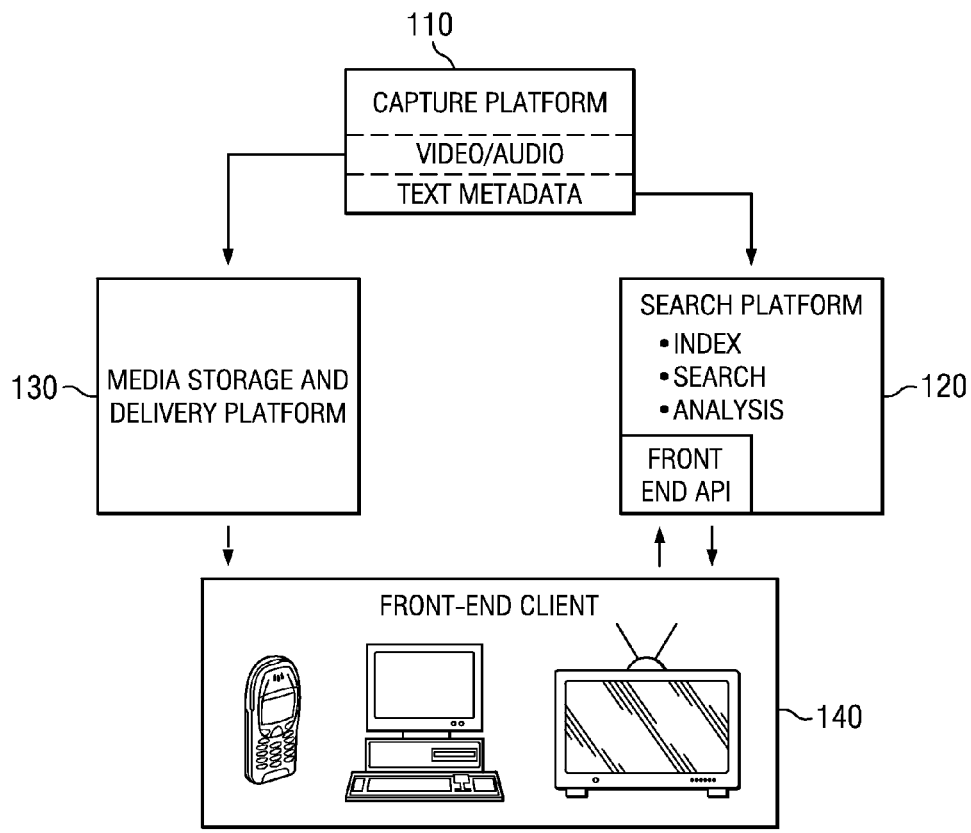
FIG. 1 is an illustration of an example embodiment of the System 100 as a whole.

Shown in FIG. 1 is a system overview illustrating an exemplary embodiment in which the System 100 is illustrated in the context of a number of architecturally distinct units. This exemplary system 100 will be shown in further detail in the other, more detailed figures and description that follows. Illustrated in FIG. 1 is a Capture Platform 110, which captures source data received from incoming video broadcasts and converts the source data into a standardized format.

Also shown in the figure is the Search Platform 120, which, as will be further described herein, extracts topics from source video metadata and manages user taste graphs, the searchable index, and the Application Programming Interface (API) layer for client interaction.

Further illustrated in FIG. 1 is the Media Storage and Delivery Platform 130. The Media Storage and Delivery Platform 130 is the backend for storage and delivery of video content to Client Devices 301. The Media Storage and Delivery Platform 130 receives the converted incoming video broadcasts and stores it in storage within the platform 130. This platform is further accessible through the search platform 120 to present source data that is found through user searches.

Figure 3:
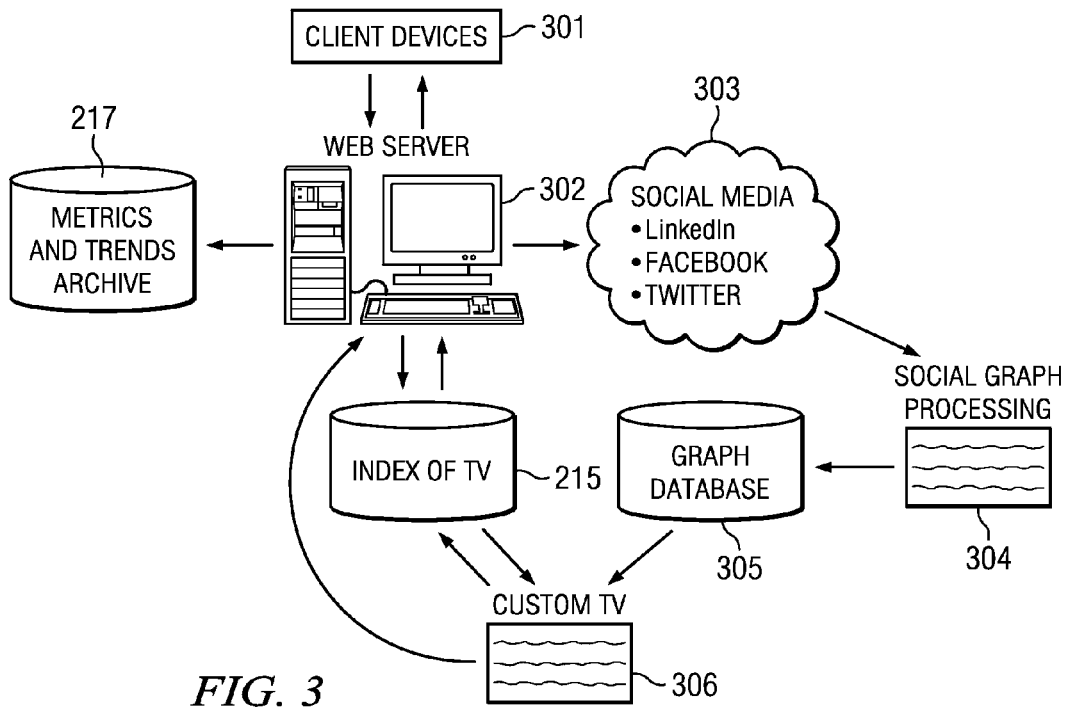
FIG. 3 is a high level illustration of an example path that data travels from storage to user interface.

Still further illustrated in FIG. 1 is the Front-End Client 140, which is a Client Device 301 (as shown in FIG. 3) through which users interact with the System 100. Through the Front-End Client 140, users will input searches and receive search results. Users will also be able to establish their customized profiles, searches, "watch lists," and perform other types of personalizations.

Figure 2:
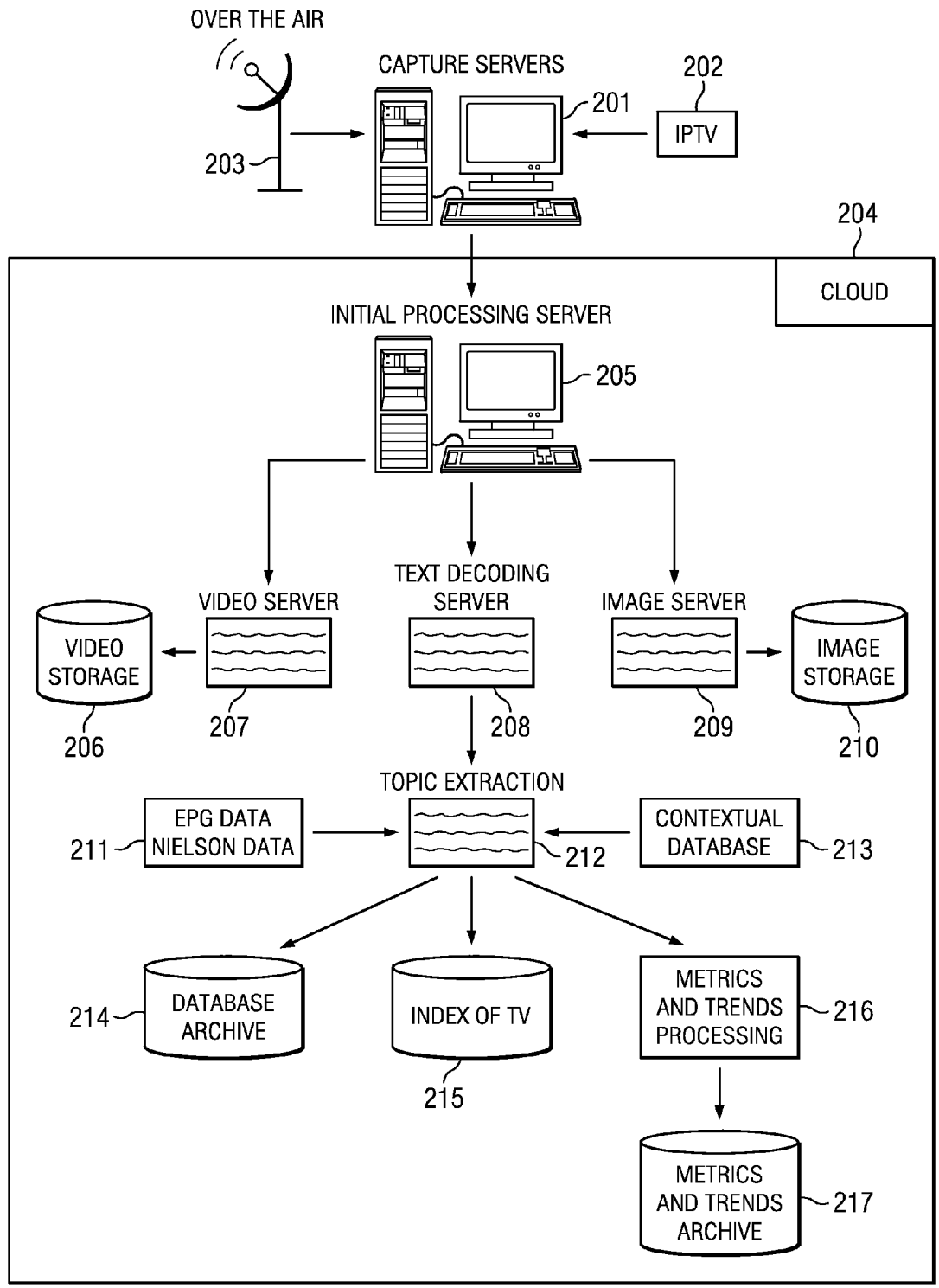
FIG. 2 is a high level illustration of an example path that incoming data travels from collection to processing.

With further reference to FIG. 1 and FIG. 2, the architectural platforms introduced above are now further described.

I. GENERAL DESCRIPTION OF PLATFORMS

A. Capture Platform 110

The Capture Platform 110 collects incoming source media and converts the content into a standardized format for use by the Search Platform 120 and Storage & Delivery Platform 130. Because television content is localized, as shown in FIG. 2, Capture Servers 201 are deployed to local geographic regions when a data feed is not available for remote collection, as in the case of analog signals, or when the cost of locally processing raw data is less than that of receiving raw data remotely, such as when delivery of raw data to a distant server will cost more in bandwidth than setting up a Capture Platform 110 locally. As shown in FIG. 2, the capture server, which is drawn in the form of a known server implementation of a computing machine that includes a user display, a user input device, and memory for storing computer-readable instructions on a computer-readable medium. Thus, as functionality for the Capture Server 201 is described below, the functionality performed by the Capture Server 201 would be provided and performed by the Capture Server 201 running computer instructions that are stored on the Capture Server's 201 computer-readable medium or computer memory, or it could be based on computer-readable instructions that are stored in an external or other computer memory.

1. Overview

Figure 4:
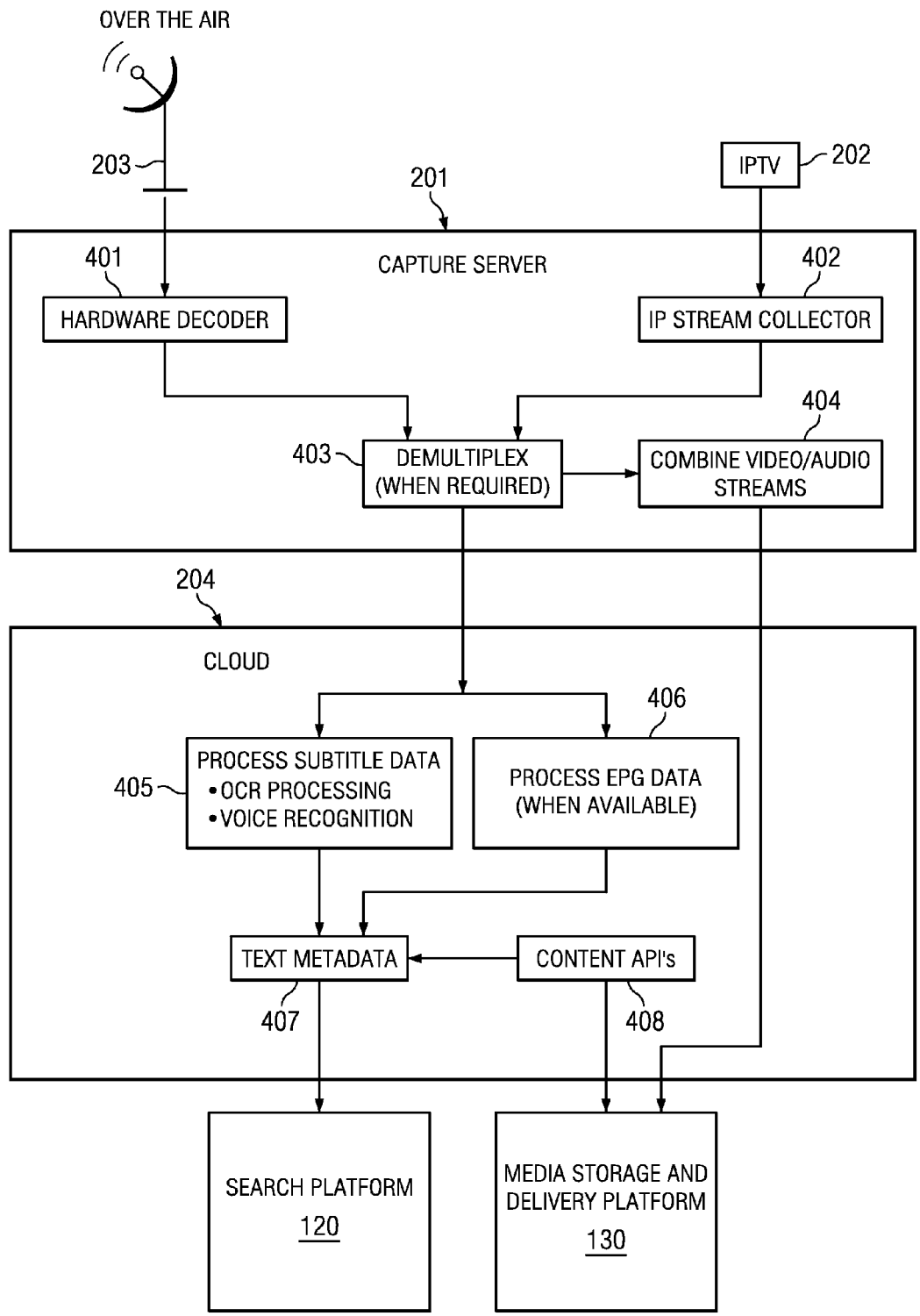
FIG. 4 is a detailed illustration of an example embodiment of the Capture Platform 110 and its functionalities.

Still referring to FIGS. 1 and 2, and with further reference to FIG. 4, the Capture Platform 110, which includes the Capture Server 201 illustrated in FIGS. 2 and 4, provides a number of functions:

To capture over-the-air data 203 and translate it into an Internet Protocol Television (IPTV) signal 202.

To process raw content data.

To extract Text Metadata 407 from the streams—for example Line 21 or Digital Video Broadcast (DVB) encoded subtitle data.

To capture API-provided content and translate it into a standardized format.

To capture additional content metadata, for example, Electronic Program Guide (EPG) data from DVB streams.

2. Infrastructure

The Capture Platform 110 may be divided between processing elements in cloud infrastructure and regionally, physically deployed Capture Servers. The regionally deployed servers convert analog streams into digital transport streams, and convert multiplexed transport streams into separated video and data. All of this data is then delivered to the Storage Platform.

Video is sent to the Media Storage and Delivery Platform 130 and the EPG and subtitle encoded Transport Streams are delivered to the Cloud portion 204 of the Capture Platform 110 for further processing.

B. Search Platform 120

1. Overview

The purpose of the search platform 120 is to process incoming data and requests for information. It does this by processing, and then indexing, incoming information; doing search functions when a user requests a specific video clip; and analyzing trends and user usage in order to fine-tune the System 100 as a whole.

2. Infrastructure

Indexing

Indexing processes act on two separate sides of the System 100:

Topic Extraction & Segmentation 212:

Topic Extraction & Segmentation component 212 is responsible for:

processing inbound content data applying real world models dividing the real-time data stream into stories, or topics, to be placed in the searchable index Taste Graph Processing:
  The Taste Graph Processing component applies real world models to user taste graph information to better match user taste graphs against the index.
Search
The search function includes processes for:
Directed Search:
  Results related to a specific query, such as a query submitted by a user in a search text box.
Push:
  Results are pushed to the user according to their registered interests. Results are also sent in real time to search engines for public indexing.
Recommendations:
  Custom Queue/Recommendations: results relevant to the user's and/or their friends' taste graph of interests
  Related Search: Results related to a specific video
  Popularity: results based on usage feedback (shares, views, ratings, etc.)
  Category: results related to trending keywords, source, locations, or categories
Analysis:
  In addition to returning an indexed result to a search query the System 100 is also engaged in the ongoing analysis of the index. It preforms this process by analyzing the following pieces of information:
Trends:
  What is popular overall, or divided by source, time, location, category, etc.
Usage Analysis:
  What users are viewing, sharing, rating or skipping. This feedback is sent to index ranking algorithms.
Sentiment Analysis:
  The 'sentiment' of content—this can be processed in the form of an overall report for sentiment, or sub-divided by topic, source, time, location, category, etc.

C. Media Storage and Delivery Platform 130

1. Overview

In disclosed embodiments of the Media Storage and Delivery Platform 130, incoming video/audio streams 404 are marked with time data and stored according to source information. The incoming video/audio streams 404 need not be physically divided. Rather, the System 100 can use Start/End data in order to determine when a relevant clip is needed, and can accordingly wrap that chunk of video/audio stream 404 in a single topic wrapper to be sent to the user.

2. Infrastructure

The Media Storage and Delivery Platform 130 can use cloud-based data storage, such as Amazon's Web Services S3 storage product. Other such cloud-based data storage approaches, such as Microsoft's Windows Azure platform, may be used. Further, a non-third-party or in-house storage system can be used. In any case, in disclosed embodiments content would be pushed to this storage infrastructure using HTTP mechanisms.

D. Front-End Client 140

1. Overview

A Front-End Client 140 is ultimately any program that a user uses to interact with the System 100 and retrieve data from it. API interactions with the platform APIs may be provided as a component of the Search platform 120 specification.

Client Devices 301 are defined as any mobile, website, IPTV devices, smart televisions, set-top boxes, gaming platforms, in-car entertainment systems, or any other web capable device. A client could equally be integrated with a content agency or broadcast network's existing platforms or platform families, such as Microsoft's Mediaroom.

Data flows of the system are enabled to take certain paths as the data is being collected, processed, stored, and retrieved. These paths are described in the following section as a series of steps that span multiple platforms and cross multiple components of the System 100.

II. DATA PATHS

FIG. 4 illustrates the data path flows of incoming video streams as they are processed by the System 100. Further description of the elements of this system is provided below.

A. Incoming "Raw" Data to Storage:

a. Step 1

Incoming data is gathered by the Capture Platform 201. This data can come in the form of at least two distinct types of input, over-the-air data 203 and IPTV data 202. Over-the-air data 203 is captured using physical capture methods such as: collecting satellite signals with a satellite receiver, collecting local channels using antennas, and plugging into a cable network in order to capture cable signals. IPTV 202 data may be streamed through the internet as opposed to more traditional methods of broadcasting television data, and usually includes more information about the content itself.

b. Step 2

The Capture Platform 201 separates the video/audio stream 404 from Text Metadata 407, assigns a unique source and time code to it, and sends it to the Media Storage and Delivery Platform 130. This unique source and time code is later used by the index to reference the video's topic after the Text Metadata 407 is processed. In the case of IPTV 202 data, the video/audio stream 404 and Text Metadata 407 are already separated, so the Capture Platform 110 simply has to send this data along to the appropriate storage locations.

c. Step 3

Text Metadata 407 is sent to the storage platform 120 where it is processed. This incoming metadata is divided into small stories called topics. These topics contain specific keywords that can be used to index the Text Metadata 407 and to assign context to the video/audio stream 404 that is associated with it.

Video/audio streams 404 passes through the search platform 120 in order to be segmented and assigned more specific source and time codes. Once this is done, the video/audio streams 404 are sent to the Media Storage and Delivery Platform 130.

d. Step 4

Once information about the Text Metadata 407 has been fully extracted, it is stored in the index under a unique topic that can later be used by a Front-End Client 140 in order to retrieve a specific video clip. Video/audio data is stored in the Media Storage and Delivery Platform 130 in segmented chunks that can easily be retrieved when a request for the specific clip is made.

B. User Query to Data Retrieval a. Step 1

A user queries a specific video clip using a Front-End Client 140 device. Or, a user with social graph data logs into a Front-End Client 140 and the System 100 can populate the user's custom video query with videos relevant to their interests.

b. Step 2

The Front-End Client 140 sends a request to the Index of TV 215 for the source and time code of the specific video clip that the user queried, or the video clip that they system deems appropriate to display on the custom video query.

c. Step 3

The Index sends the source and time code data to the Media Storage and Delivery Platform 130.

d. Step 4

The Media Storage and Delivery Platform 130 filters through its stored data streams for the specific section of data that the user requested.

e. Step 5

Upon locating the requested video clip, the System 100 wraps the clip, along with its start/end time data and source information, in a content wrapper and sends the combined files to the Front-End Client 140.

III. BACK-END PROCESS

The back-end process and system elements are discussed below in further detail with reference to FIG. 2.

A. Capture Servers 201

Incoming data is gathered by Capture Servers 201. This data comes in the form of two distinct types of input:

B. Over-the-Air Data 203:

Over-the-air data 203 is captured using physical capture methods such as: collecting satellite signals with a satellite receiver, collecting local channels using antennas, and plugging into a cable network in order to capture cable signals. Because these physical capture methods are regional, Capture Servers 201 may be placed in a specific region to gather local TV signals within that region. For example, if a user living in Liverpool UK is taking a trip to the United States and wishes to know what is currently happening in that country, a regional Capture Server 201 would mean that television streams from the United States could be made available to that user.

C. IPTV Data 202

Internet Protocol data is in some respects easier to collect. Because it is streamed through the internet as opposed to more traditional methods of broadcasting television data, it usually includes more information about the content itself. IP data is available where ever an internet connection is available, and because the internet is almost universally accessible, physical servers aren't necessarily. Rather, all that is needed it to connect a Capture Server 201 to the internet and deliver the incoming content to the Initial Processing Server 205.

This data is preprocessed in the Capture Servers 201 according to type. Over-the-air data 203 usually comes as a massive data stream, and oftentimes needs to be demultiplexed (broken up into individual channel streams and Text Metadata 407) in order to be transported to the initial processing step. In certain described embodiments herein, preprocessing is not necessary. The IPTV data 202, for example, generally comes pre-split and ready for initial processing. The Capture Server 201 may further be operable to place the captured video streams into a regular format that can be recognized and processed by the Initial Processing Server 205 below. The formatted video streams may then be sent from the Capture Servers 201 to the Initial Processing Server 205.

D. Initial Processing Server 205

Once data is captured and converted into a format that can be more easily transported; the Capture Server 201 sends this data through the internet to the Initial Processing Server 205. Initial processing is done primarily to separate the incoming preprocessed data and sort it into its according processing and storage divisions. As FIG. 2 illustrates, once the Initial Processing Server 205 has completed sorting, it sends the sorted data to the Text Decoding Server 208, the Video Server 207, and the Image Server 209.

E. Video Processing Server 207

Video and Audio Streams are sent to the Video Processing Server 207 from the Initial Processing Server 205, where they are divided up and a unique time stamp and source code is assigned to the incoming data. The video stream may not actually be physically divided up, but rather a time stamp may be assigned to every second or so of video. Video may, for example, be stored in hour-long chunks, but this is simply for storage purposes and has nothing to do with the length of a video viewed by a user. When a user makes a query for a specific video clip, which could be any of size, the System 100 does not need to reassemble chunks of divided video. Instead, all it really has to do is look for the start and end time of the video the user requested, find the source of that same video, and pluck that specific chunk of video from the stored stream. If a user requests a clip that spans multiple hour-long segments, the System 100 has the capability to retrieve the two separate pieces of information and reassemble them before delivering the requested video to the user. Once the streams have been assigned source and start/end time data, they can be delivered to Video Storage 206.

F. Text Decoding Server 208

As illustrated in FIG. 2, the Text Decoding Server 208 receives incoming text data from the Initial Processing Server 205 and extracts individual words from the incoming Text Metadata 407. The Text Decoding Server 208 does this through the use of Voice Recognition and OCR, or Optical Character Recognition, applied to Subtitle data. In this way, analog information can be converted into a digital format that algorithms can be applied to. This process is explained in further detail later in this document.

G. Image Server 209

As pictured in FIG. 2, the Image Server 209 receives images from the Initial Processing Server 205, and divides them up into individual thumbnail components. The purpose of the Image Server 209 component is to take individual frames from the video stream and uses them as thumbnails. These thumbnails are used in Front-End Clients 140 in order to give the user a preview of any given clip. Images taken by the Image Server 209 are stored in the Image Storage 210.

H. Image Storage 210

As shown in FIG. 2, once the Image Server 209 has finished extracting thumbnail images from a video clip, these thumbnails are sent to the Image Storage 210 to be stored. When a user opens a Front-End Client 140, a series of thumbnails are displaced as representative of the video/audio clips they represent.

I. EPG and Neilson Data 211

As FIG. 2 illustrates, additional data from a video clip's EPG and Neilson Data 211 can be used to add more context to a clip to make it more easily categorized.

J. Topic Extraction & Segmentation 212

As FIG. 2 further illustrates, once text subtitle and OCR data has been processed in the Text Coding Server 208, it is sent to Topic Extraction and Segmentation 212. This is where the bulk of processing is performed using semantic and grammar processing, key term searches, input from EPG and Neilson Data 211, information from the Contextual Database 213, and other sources of information that can provide Entry Extraction 212 with information as to the contents of the text data. Once Entry Extraction has collected enough information about a collection of Text Metadata 407 to assign the data a Topic, the Text Metadata 407 is delivered to the Database Archive 214, the Index of TV 215, and the Trending Metrics 216 component. This process is further described later in this document.

K. Contextual Database 213

The Contextual Database 213 is composed of a number of dictionaries that aid in applying a topic to a given video clip based on the translated Text Metadata 407. As FIG. 2 displays, Topic Extraction 212 makes use of these contexts when assigning topics to video clips.

L. Database Archive 214

Once topics have been assigned to the processed text data in the Topic Extraction & Segmentation component 212, the text data is delivered to the Database Archive 214.

The Database Archive 214 substantially serves as storage for all topic information. This archive is described in the present embodiment as a static index, such that once information is sent to the Database Archive 214, it does not change. In this embodiment, this insures that all information that the System 100 processes has a solid backup copy.

If an indexed topic is categorized incorrectly, the Database Archive 214 provides a means for correcting these problems if the topic is too wildly incorrect to be easily fixed. Because the System 100 is dealing with imprecise information in the form of TV content, it is advantageous to provide a method and means for making such corrections.

Also, if a user needs a particular clip from a particular time on a particular channel, the Index of TV 215 is not well-suited for searching for information according to these parameters. In the instance that this data does need to be found, the Database Archive 214 is better equipped to handle requests of this nature.

M. Index of TV 215

After Text data has been assigned topics in the Entry Extraction 212 component, it is delivered to the Index of TV 215.

The Index of TV 215 is a dynamic index that continually changes and updates itself as more information is received. This component of the System 100 contains all current updates of all topics, and is referenced by the Front-End Client 140 of the System 100 when looking for user requested content. When user requests are combined in the Custom TV 306, they pass through the Index of TV 215 on their way out to the Front-End Client 140.

IV. FRONT-END PROCESSING

FIG. 3 represents the path data takes when a user inputs information into a Client Device 301.

A. Client Devices 301

Client Devices 301 represent the basis of user interfaces. A client device is defined as anything that an average user can use to connect to the System 100. The basic form of a client device is a website with a Graphic User Interface, or GUI. However, this is by no means the only client device the System 100 could connect with. Anything with an internet connection such as gaming systems, mobile phones, tablets, laptops and vehicle media systems could easily have an application adapted to access the System 100 and retrieve videos for users.

There are two distinct processes through which a Front-End Client 140 request and receive video content to display to users. They are user-specific search queries and system recommendations.

User-specific search queries are things users specifically request, such as a specific clip, "President Obama's inauguration speech" or a parameter of things the user wants to see, such as "President Obama, the economy, CNN." The latter example may return several results. As far as the Front-End Client 140 is concerned, user-specific searches are begun when a user types a list of parameters or a specific clip title into a search box and clicks send.

System recommendations are a little more complex than user-specific searches, and pull information from a lot more places than a simple direct search. A system recommendation is activated when a user logs into a client with a pre-established account. When the GUI uploads, part of it can include a "recommendations" box. This box might display, for instance, several thumbnails of videos that the System 100 has reasoned the user might like based on past searches, information gathered from social graphs, behavior during different clips (such as pausing or skipping certain clips,) and other factors that the System 100 can use to aggregate a user's interests.

It is also worth noting that whenever a user makes a request or clicks on a recommend video clip, the Client Device 301 reports to the Web Server 302 that a video has received some sort of feedback. The Web Server 302 then sends this information to the Metrics and Trends 217 component for further processing.

B. Webserver

The webserver 302 may act as a gateway to and from the System 100. It acts in this regard to direct requests from Client Devices 301 to the system components, and to push requested content from the Index of TV 215 back to the Client Devices 301.

C. Metrics and Trends Processing 216

The Metrics and Trends Processing component 216 is where information about a specific clip can be found. This information isn't necessarily what a clip is about. Rather, it is information about how popular a clip is, how users behave while watching it (pausing, skipping, etc.), and also how frequently a clip is searched for, ignored, or viewed.

The purpose of compiling all this information is to place higher quality, more universally liked clips at the "top" of user access and to place damaged, bad quality, or irrelevant clips closer to the "bottom" so that users rarely, if ever, have to view a bad clip.

D. Metrics and Trends Archive 217

As FIG. 2 illustrates, once the Metrics and Trends Processing component 216 has finished extracting information, the data is sent to the Metrics and Trends Archive 217, where it can later be accessed.

E. Social Media 303

Social Media 303, such as Facebook, Twitter, LinkedIn, and other Social Media 303 websites, are a valuable source of data when determining a specific user's interests. Because these sites actively gather information about not only a single user, but the network of other users any one user is associated with, a massive quantity of information can be gathered about what the user likes, and also what the user is likely to become interested in based on their friends' and connections' interests.

When a user first sets up an account with a Front-End Client 140, they are given the option to connect their Social Media 303 to the client; it is at this point that the System 100 sends a request for information to these Social Media 303 outlets. However, the System 100 can update itself when a change is made to one of these Social Media 303 outlets. These Social Media 303 outlets return the request with a Social Graph that the Social Graph Processing 304 component can extract information from.

F. Social Graph Processing 304

When the System 100 receives a social graph, it sends the graph to the Social Graph Processing component 304 in order to extract a user's interests and arrange them in a way that trending topics can be related to.

The System 100 can also make use of social graph information to add context when a user makes a search query. For example, if a user searches for "Apple," that search query may turn up results involving apple the company or apple the fruit. However, if that user has mentioned Apple the company or likes Apple the company in one or more Social Media 303 outlets, the System 100 can infer that this user is requesting video clips about Apple the company.

G. Graph Database 305

Once the Social Graph Processing component 304 component has extracted the necessary information from a given social graph, it deposits the graph in the Graph Database 305. The Graph Database 305 is a general storage space used to house processed graphs in a form that the System 100 can use to compile custom video line-ups for individual users.

H. Custom TV 306

The Custom TV 306 component assembles a group of videos that the System 100 assumes a user will be interested in. It first collects social graph data from the Graph Database 305 in order to determine a user's interests. It then requests relevant Video clips from the Index of TV 215 and sends them to the Web Server 302 which delivers the recommended videos to the user's Client Devices 301.

V. DETAILED CAPTURE PLATFORM 110 DESCRIPTION

A. Platform Inputs

The Capture Platform 110 can consume data from any of a number of sources:

1. Over-the-Air Content 203:

Over-the-air content 203, such as Satellite, Cable, or Antenna delivered broadcast content, can be captured and converted into a digital IPTV stream for processing using video capture hardware 401. This content can have several channels multiplexed together.

2. IPTV Streams 202:

IPTV streams 202 can be captured and processed. Because these streams come directly over the internet, no physical capture device, such as a satellite dish or a cable box, is necessary to collect them. Like their analog equivalents, these streams can contain a number of channels multiplexed together. The capture system demultiplexes the signal into individual Transport Streams, including:

a. Video/Audio Streams 404:

Which are then re-combined in MPEG video files containers.

b. Subtitle Data:

Which is usually in DVB or Line 21 format (EIA-608, CEA-708 and ETS 300 74.) The DVB format in particular poses a problem, because it is image based and therefore requires an additional step of Optical Character Recognition (OCR) processing to Decode text data from the subtitle images to decode text data from the subtitle images. These images are pictures of the sentences that is displayed on screen as subtitles—commonly, white text on a black background.

c. EPG Data:

Captured IPTV 202 streams can contain encoded EPG data which is decoded for delivery alongside the subtitle metadata. When EPG data is not included in the initial bundle of Multiplexed data, it can be collected from commercially available internet distributed feeds.

3. Additional IP Information:

Content Providers expose a variety of proprietary APIs for content delivery; these are generally HTTP and XML protocol driven APIs.

4. Content APIs 408:

Content Providers expose a variety of proprietary API's for content delivery, generally HTTP and XML protocol driven. Rather than physical servers, the Capture Platform 110 servers for these APIs are deployed to Cloud 204 infrastructure. Content from these sources are preprocessed, so when they are delivered to the Capture Platform 110, the only processing necessary is to split the information into Text Metadata 407 and video/audio 404 streams, which are delivered directly to the Search Platform 120 and the Media Storage and Delivery Platform 130s, respectively.

B. Platform Functionality

The Capture System 110 is broken into a number of system elements, based on location and need. The first of these system elements is the Capture Server 201, which is operable to collect raw data, preprocess it, demultiplex it, and stream it into the System 100. The second of these system elements may exist in a cloud infrastructure 204. Its purpose is to begin the process of splitting data up by extracting Text Metadata 407, applying a format the Search Platform 120 can understand, and delivering it to the search platform for the Topic Extraction & Segmentation component 212. The cloud infrastructure component 204 of the Capture Platform 110 may also receives Content API data 408, splits it into Video/Audio Streams 404 and Text Metadata 407, and delivers it to its respective platforms.

C. Platform Outputs

After processing, the Capture Servers 201 output:

Video:

Video is sent to the Media Storage and Delivery Platform 130.

Text Metadata 407:

Text Metadata 407 is sent to the Search platform 120. Metadata is sent as a JavaScript Object Notation (JSON) formatted object, but any extensible data format can be used (XML, BSON, etc.) This data can include:

Subtitle Text

API Provided Text Content (articles or transcripts)

Time data, of particular importance for subtitle content.

Program/Item Title & Description

Rating Information: Adult/Violent/etc. provided by the EPG program data, time of day (watershed in the UK and Safe Harbor in the US for example), API supplied field, or defined by source (e.g. children's programming channel.)

Additional Category Information: Channel Source, EPG, or API content may each provide category information such as News, Music, Entertainment, etc.

Confidence: where voice recognition is used, result confidence value

VI. DETAILED SEARCH PLATFORM 120 DESCRIPTION

Figure 5:
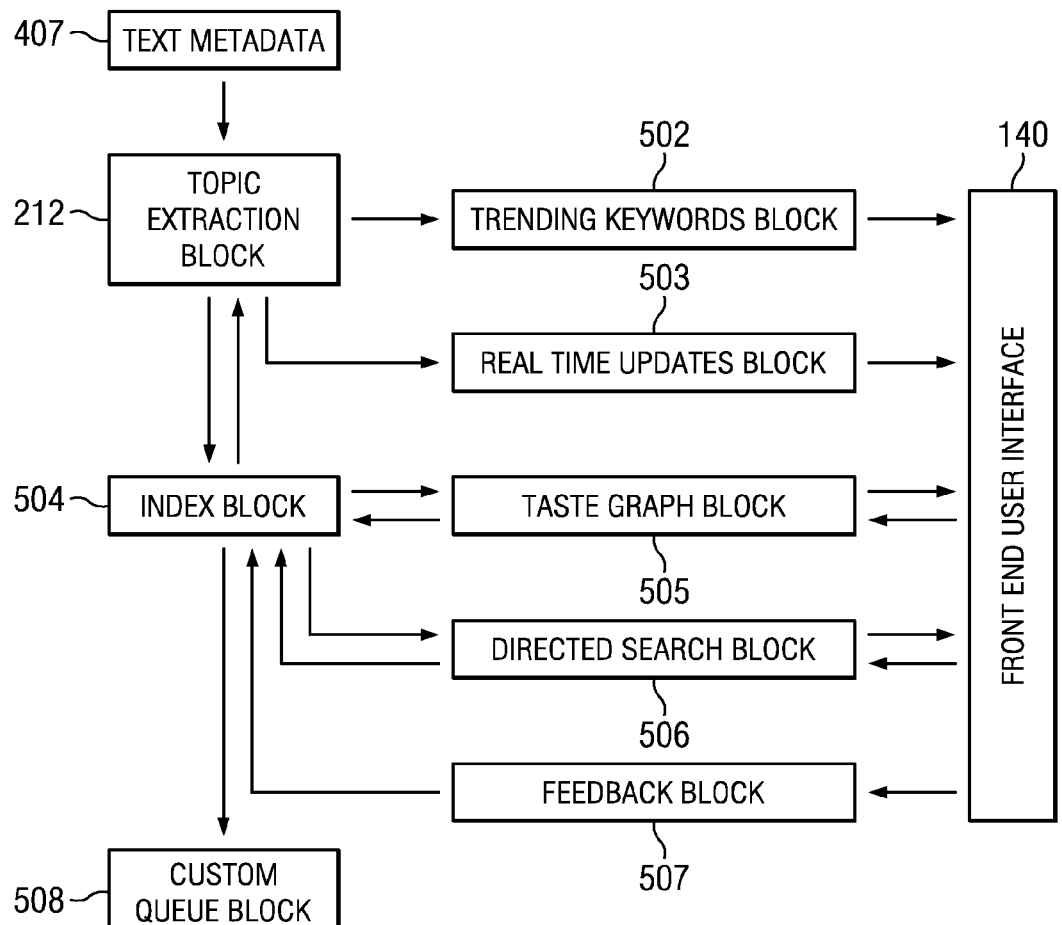
FIG. 5 is an illustration of an example embodiment and the possible paths that data takes through the functionality blocks of the search platform 120.

FIG. 5 illustrates a block diagram for the search platform 120, including platform inputs, functionality, and outputs as will be described below.

A. Platform Inputs

The Search Platform 120 receives incoming Text Metadata 407 provided by the Capture Platform 110.

B. Platform Functionality

The Search Platform 120 is divided into the following functional blocks:

a. Topic Extraction & Segmentation Block 212

At the Topic Extraction & Segmentation Block 212, the incoming data stream is divided into Topics, small story segments extracted from a continuous source. These Topics contain not only specific keywords, but also the related ontologies, sentiment and confidence data.

b. Video Segmentation Block 501

At the Video Segmentation Block 501, the continuous video stream is divided into smaller, more easily managed chunks of data.

c. Trending Keywords Block 502:

In the Trending Keywords Block, topics are aggregated according to source, time and categories.

d. Real-Time Updates Block 503:

The Real-Time Updates Block 503 delivers results in real time to Client Devices 301. These results are produced by combining data as it is received in real time with users' taste graph information.

This Block 503 delivers these results according to users' personalized profiles is operable to receive topics and match them to registered user profiles so that the topics can be delivered to the users' Client Devices 301 as, for example as "Breaking News" alerts or "Now on Channel X: . . . ".

This component manages the pairing of the topics to users and, in addition, management of the users' volume settings, which define how often they expect to be notified of events on their Client Devices 301.

e. Index Block 504

The System 100 defines multiple indexes with multiple purposes; however the Index Block 504 within the Search Platform 120's functionality is primarily responsible for tracking information related to the content and topic information concerning specific chunks of video data. Once Topic Extraction 212 has completed extracting the topic from a given set if text data, it delivers that same text data to the index to be filed. The Index Block 504 is also responsible for housing user taste information once it has been extracted from user behavior. As FIG. 5 also displays, the index is also responsible for returning information to the Directed Search functionality block when a user makes a direct search request.

f. Taste Graph Block 505:

A taste graph as provided in the Taste Graph Block 505 is the categorization and management of user taste graph data, so that it may later be applied to the index to produce relevant video results. This taste graph is a combination of information gathered from Social Media 303, and information gathered from the Feedback Block 507. Process By combining users' tastes graphs and received topics, a set of suitable users and relevance confidence weights is produced.

Each user has a 'volume' setting for their registered Client Devices 301 that specifies the frequency which notifications appear. This can 'learn' user behavior, according to whether notifications are viewed or dismissed.

On the basis of the volume and relevance confidence, the System 100 can make one of three decisions:

Match: Send an update to the user

Wait: The topic is a good match, but the user has recently been sent an alert or Block: The user volume and match confidence weights are low and so the push should not be sent. This can be detected in the initial user matching.

To prevent never ending processing of inactive users, an overriding setting automatically tapers out alerts (exponential back off) as time passes without user activity.

g. External Search Engines

The PubSubHubbub protocol is used to publish real-time results to Search engines for indexing (e.g. Google, etc.)

h. Directed Search Block 506:

Directed searches include query processing for directed search, and the necessary interaction with the search index to produce a search result.

i. Custom Queue Block 508:

The query delivers custom result sets generated by combining user taste graph data with the search index. The queue offers options to client implementations to choose different options for ordering a result list:

Time: Prioritize recent results (strictly or loosely)

Relevancy: Prioritize the most relevant results

Context Spread: With each result set, include a mixture of contexts, for example: some news, entertainment, sport, etc.

Relevance is determined by topic and interest confidence matching and is driven by Lucene, or an alternative search engine's, native relevancy mechanisms.

j. Feedback Block 507:

Feedback includes the processing of explicit and implicit user behavior data to manage the index relevance rankings and user graph data.

Usage feedback forms are an important aspect of managing the index and tuning the relevancy algorithms within the System 100.

Feedback can be categorized as:

Explicit: When a user shares a clip or rates a clip positively or negatively.

Implicit:
When a user selects the clip from a list.
When a user presses skip/stop before completion, or any other user behavior that may give feedback as to a user's feelings towards a clip.

This feedback serves many purposes throughout the System 100, including:

Search Ranking: Rated and Shared clip are boosted within the index. Negatively rated clips, or those skipped or stopped prematurely, are diminished within the index.

Segmentation: Premature skip or stop actions at the end of a video may indicate a clip needs to be shortened.

Directed Search: Keywords entered as direct search queries serve to boost their related keywords in trending topic results.

User Specific: Client applications, such as mobile apps or websites, allow users to rate items.

Frequent negative ratings indicate a problem with the active video item, either in terms of content quality or relevance. Negative ratings are applied to the index as a whole, in order to suppress poor quality content from the core index's base.

Additionally, the taste graph of the user who negatively rated the item is updated because a negative rating towards content within a certain topic context may indicate that the user is less interested in the topic. Positive ratings boost overall index rating for individual topic items and within that users' taste graph, the assumed interest in the associated topic for the user.

k. Directed Search Block 506

Directed search is the result of specific user input into a client's search function.

l. Reporting

Reporting is required for user behavior analysis and overall product performance. This includes the number of active users, video items consumed, and other indicators as a high level product overview. Deeper reporting may also be provided in parallel with the Feedback analysis to indicate algorithm performance.

m. Advertising

Along with paid subscription agreements, advertising can be a basis for revenue generation. Where advertising is used, the topic and related ontologies of individual items can be leveraged to provide more context relevant advertising results. Advertising models also require additional reporting, to define performance and potentially to execute revenue sharing agreements.

Because the System 100 recognizes the words within the program and the result is in response to a user's directly or indirectly indicated interests, we can provide highly relevant advertising around the content and therefore, highly specific advertising for individual users. For example, where traditional advertising might recognize that certain demographic watches Piers Morgan on CNN, the disclosed System 100 can recognize that Piers Morgan is on CNN, talking with or about Lady Gaga, a celebrity pop musician, who in turn is talking about her new shoes in New York. While the applications of this context awareness in delivering content have been described, this context awareness can also be combined with advertising inventory to provide highly relevant and targeted advertising results.

Because advertising is based on the topic context, some clips will have a higher monetary value than others. These high value clips can be exploited within the algorithms to play advertising more often than those clips with less contextual value, although care is taken so that the introduction of advertising is not damaging to the user experience and does not cause an unnecessary increase in negative feedback.

To gather more direct user feedback, client implementations include functionality to prompt the user for specific reasons when negative feedback occurs. These reasons may include asking whether the rejection was related to relevance, video quality, timing (segmentation) issues, etc. This provides a tool during testing and ongoing usage as to an alternative option to client advertising and subscription fees.

n. Monitoring

Monitoring services are required to track the status of the platform as a whole, the throughput/performance of its subsystems, and any errors that may be occurring. Within the cloud environment 204, this monitoring can be used to manage the number of available server 'instances' and automatically scale capacity to meet user demand.

C. Platform Outputs

After processing, the engine is left with the topic information and the user to send it to. The details of specific client API's for real-time messaging can include:

XMPP Support for Web Clients

Apple iOS Push Notifications for iPhone OS4 and later.

MQTT protocol for Android/RIM and mobile devices without platform enabled push support The Search Platform 120 Outputs information about a specific clip that users have requested. This information is not the clip itself; instead it is used by the Media Storage and Delivery Platform 130 in order to call up specific clips requested by users.

VII. DETAILED MEDIA STORAGE AND DELIVERY PLATFORM 130

Video content is stored in a scalable data store, with streaming servers to support delivery to clients.

A. Platform Inputs

The Media Storage and Delivery Platform 130 receives Video/Audio streams 404 from the Capture Platform 110 and stores them with a unique time stamp and source data. It is this time stamp and source data that the platform references when a request is processed.

B. Platform Functionality

1. Storage

Cloud-based storage 204 provides advantages by reducing initial infrastructure costs and by removing ongoing infrastructure management costs; while at the same time, providing the benefits of local and geographic redundancy. In addition, cloud storage providers include a set of supporting services (e.g. Contest Distribution Network or "CDN" delivery).

Video files from live content may, for example, be divided into 1-hour-long blocks. This 1-hour duration is purely a mechanism to divide the content and make management easier—the actual length of content stored will be varied and can be adjusted within the Storage Platform.

2. Thumbnails

The storage server is also responsible for storage and delivery of video thumbnails. These are generated as the stream is delivered through the Capture Platform 110 and stored as static files for delivery via CDN. These thumbnails are organized in a folder hierarchy incorporating the source and date information.

3. Delivery

As discussed in the segmentation process, topics generate segmented lists of videos only if absolutely necessary. The majority of the time the delivery server extracts stream segments and wraps them in file wrappers on demand. Where on demand transcoding is not possible, baseline profile files are created, for example in different output dimensions.

4. Digital Rights Management (DRM)

DRM can be applied using licensed third party plugins to the delivery platform.

C. Platform Outputs

The Media Storage and Delivery Platform 130 outputs video segments to the Front-End Client 140 to be viewed by users.

VIII. FRONT-END CLIENT 140

A. Platform Inputs

The Front-End Client 140 receives input from two specific sources.

User Inputs

When a user inputs a specific search into a search field within the client itself.

Taste Graphs:

The System 100 uses taste graph information to generate custom video recommendations to users. To simplify generation of a user's taste graph, the clients exploit social APIs.

Merely by submitting taste graph information, the System 100 can build a picture of global user interests and popular terms. This information serves as a basis for relevancy calculations.

Because the System 100 algorithms feed from such a broad set of inputs, traditional Information Retrieval test strategies are employed to build confidence in various algorithms.

Facebook Open Graph: Users may use Facebook Graph API functionality to connect their account to their Facebook profile, where a rich dataset of tastes and interests can be retrieved.

LinkedIn: Similarly, LinkedIn offers Open Standard for Authorization API's through which a graph of connections, in particular related to organizations, can be retrieved.

Twitter: Twitter also uses Open Standard for Authorization derived API to retrieve a user's Twitter graph of interests.

Others: Any other API that can produce an interest graph for a user can be used by the client device(s), so long as the interests are delivered in a standard format to the Search platform 120.

Users are able to generate, augment, and modify their compiled taste graph. However, this should be managed using the server generated compiled and processed view of their profile data, rather than the original social graph data, enabling the platform to reimport this source data and apply the same corrections.

B. Infrastructure

The Infrastructure of this platform is largely vague. In general, a Front-End Client 140 can be defined as anything that has access to the System 100, so creating a specific description may limit the scope of the System 100's capability at a later date.

C. Feedback

As a user interacts with a client device, usage feedback is delivered to the Search platform 120 services as an aid to tuning search and indexing algorithms. This feedback is described as part of the Search platform 120 outline.

IX. FRONT-END CLIENT 140

API interactions with the platform APIs are a component of the Search platform 120 specification.

Client Devices 301 are defined as any mobile, website, IPTV 202 devices, smart televisions, set-top boxes, gaming platforms, in-car entertainment systems, or other web capable device.

1. Video List

The majority of client user interfaces include a list of videos, generally displayed as a thumbnail, and Text Metadata 407 that includes program title, topic, video source, and duration.

Video Lists are generated according to:
Custom Video: (based on the user's Taste Graph)
Trending Topic: Based on trends
Directed Search: Results for keyword lookups
Popular: Most Shared, Most Viewed, etc.
Category/Topic Based: e.g. related to News, Politics, etc.

2. Trending Keywords

As described in the platform description, trending topics may be represented on Client Devices 301.

3. Social APIs

To simplify generation of a user's taste graph, the clients exploit social APIs.

Facebook Open Graph: Users may use Facebook Graph API functionality to connect their account to their Facebook profile, where a rich dataset of tastes and interests can be retrieved.

LinkedIn: Similarly, LinkedIn offers Open Standard for Authorization API's through which a graph of connections, in particular related to organizations, can be retrieved.

Twitter: Twitter also uses Open Standard for Authorization derived API to retrieve a user's Twitter graph of interests.

Others: Any other API that can produce an interest graph for a user can be used by the client device(s), so long as the interests are delivered in a standard format to the Search platform 120.

Users are able to generate, augment, and modify their compiled taste graph. However, this should be managed using the server generated compiled and processed view of their profile data, rather than the original social graph data, enabling the platform to reimport this source data and apply the same corrections.

4. Feedback

As a user interacts with a client device, usage feedback is delivered to the Search platform 120 services as an aid to tuning search and indexing algorithms. This feedback is described as part of the Search platform 120 outline.

5. Real-Time Updates

Push mechanisms are used on various devices to support immediate alerts when relevant content appears. The mechanisms to support this are described in the Media Storage and Delivery section.

Note: there is a client use case scenario where users are alerted that content is currently being broadcast, without actually delivering the video ("Lady Gaga is now on Channel X!").

6. Wi-Fi Prediction

For mobile devices, the type of connectivity can be determined using device specific APIs to determine whether the data network connection is via Wi-Fi or mobile network (3G/GPRS/Edge/etc.). The client tracks this connectivity so that when a push notification arrives, the client can automatically chose to delay presenting the notification to the user if the client is likely to connect to Wi-Fi before a timeout period.

The predication of Wi-Fi availability may be based on data collected on the device of historic behavior, with consideration of the days of the week and public holidays. This mechanism helps to reduce mobile network data consumption and the possible associated data charges. The higher bandwidth connection speeds of Wi-Fi also enable delivery of higher quality video than might be possible over mobile network data connections.

7. Administration

API functionality may be exposed for administration tasks, such as blocking keywords or topic items.

8. API Design

A REST based API handles client interactions. Which, because of its client facing nature, is cached and distributed. Video Queues are delivered in a format based on a MediaRSS protocol in multiple output formats, e.g. RSS, ATOM, XML, JSON, etc. Although there are elements that require extension of the protocol, its use provides a base for the data format design.

9. Supplementary Requirements

Hand-picked 'Featured' items, analytics and any other web supporting services are left to the client implementation.

X. EXAMPLE CLIENTS

A. Web Client

FIG. 10 illustrates an example web client interface and its functional components. This interface demonstrates the use of a number of platform elements:

1. Trending Topics 1001:

As delivered from the Trending Topics engine. The small 'pin' icon beside the 'Trending' title text in this example is described as a location pin, suggesting that the results are local to the user, rather than the being a 'global' trending topic. This is implemented using the location segmentation as described in the Trending Topics section of this document.

2. Custom Video Queue 1002:

The Users' Custom Video Queue is displayed as a series of thumbnails at the bottom of the page. This is custom to the logged in user, so it would be replaced with a login button if no user is currently signed in.

Discover 1007 replaces the custom video queue with a series of featured items, drawing these results from the Custom Queue block 508 of the platform (optionally filtering results to match a user's location).

3. Shared 1003:

'Shared 1003' provides a similar queue format, to discover 1007, with the number of times an item has been shared 1003 (on social networks, Twitter/Facebook/etc.) as the result order.

4. Video Player 1004:

The active video item, as selected from the active custom queue, discovers or shared 1003 tab.

5. Transcript 1005:

The transcript of the active video is displayed. This can be delivered from the data store based on the topic source/channel and time.

6. Search Box 1006

The Search Box 1006 is where a user would type in a request for a specific video.

B. IPTV Client

Figure 11:
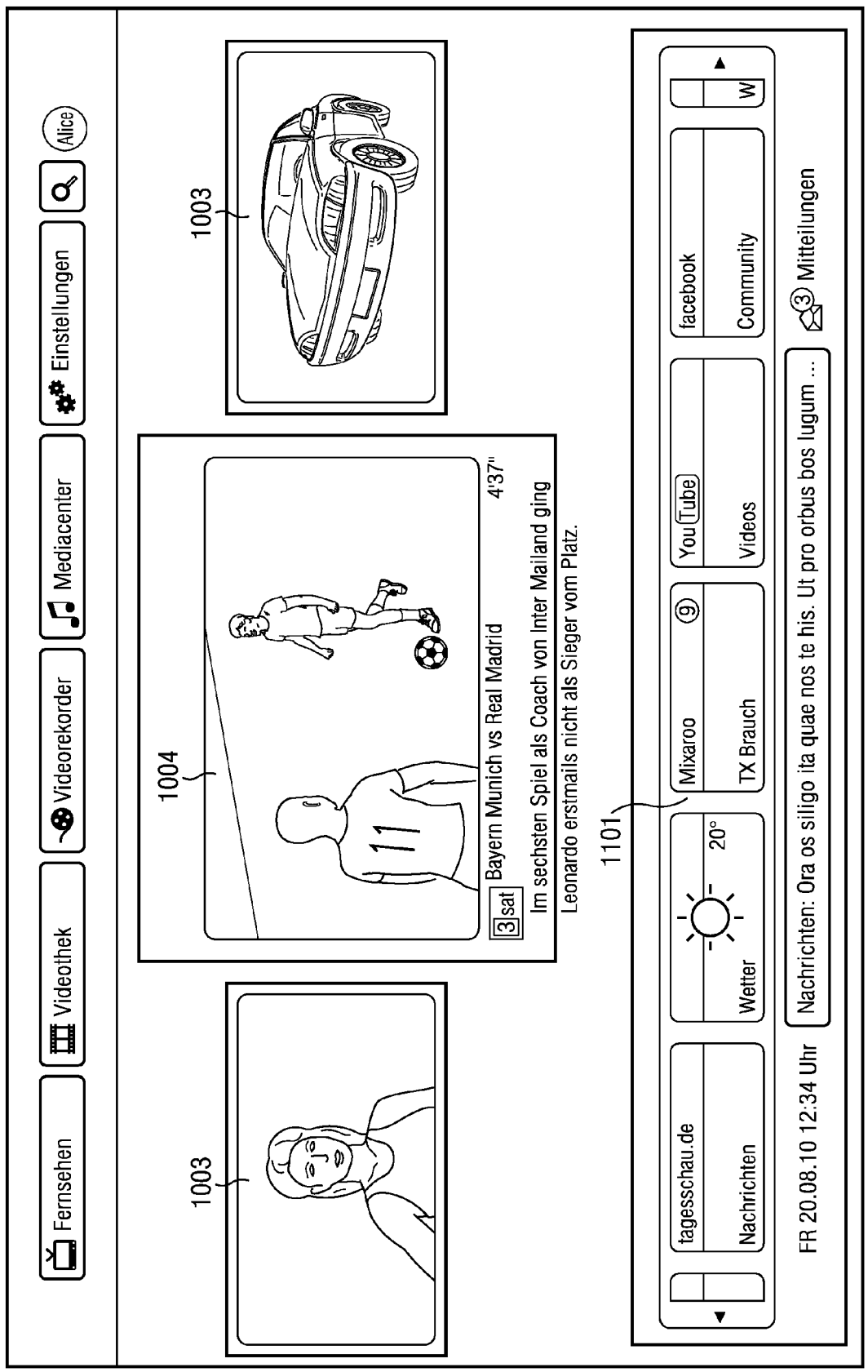
FIG. 11 is an example of an IPTV client.

FIG. 11 illustrates an example IPTV client and its functional components.

The IPTV interface example offers a little less functionality than the web example, but displays an 'App' Selection 1101 at the bottom of the page, and above that, the custom queue of video items to select from.

The video thumbnails show the view after the user has connected to their social account to configure their interests, or, like the web based 'Discover 1007' list, featured/top ranked items for users who are not connected.

C. Mobile Client

Figure 12:
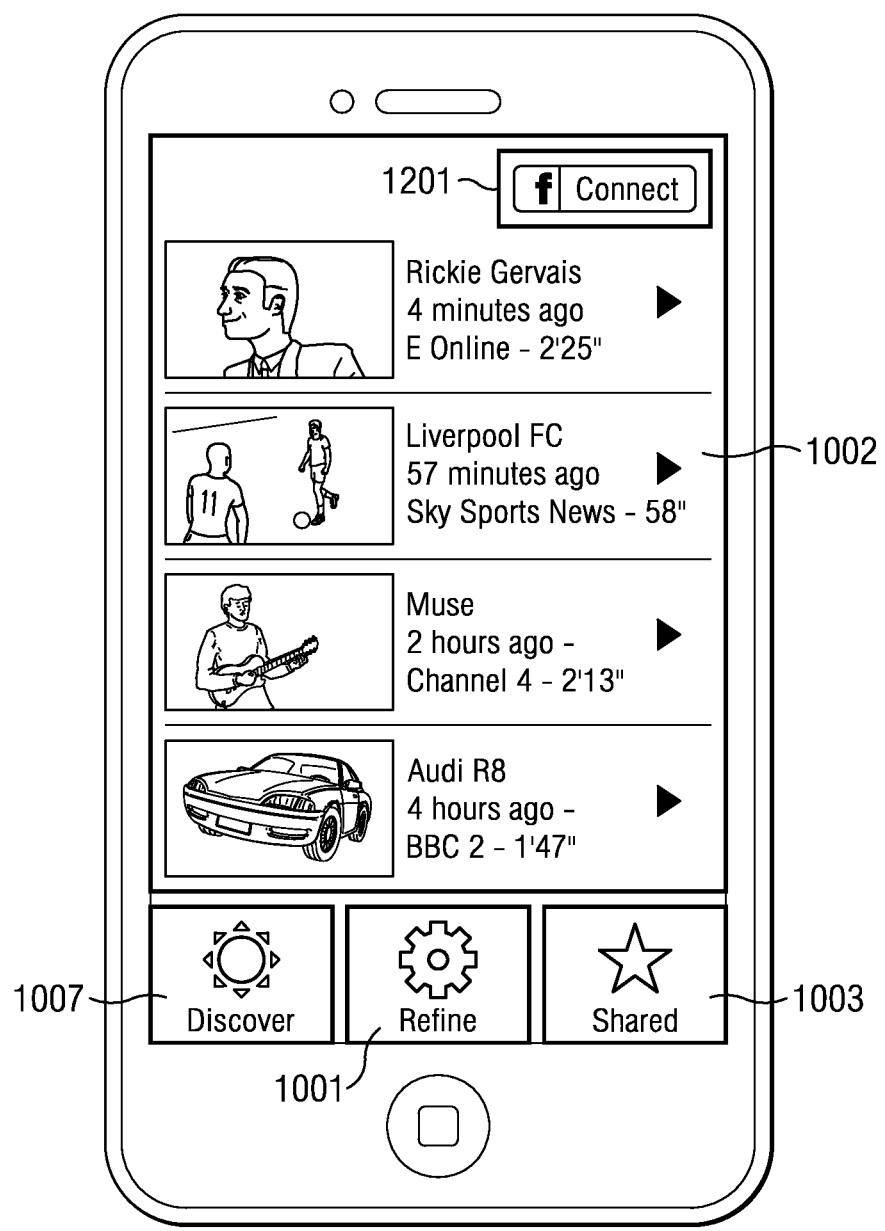
FIG. 12 is an example of a mobile device client.

FIG. 12 is an illustration of an example mobile client. Again, like the Web App, the exemplary web app described above, a custom queue is displayed, along with the 'Discover 1007' and 'Shared 1003' buttons.

The 'Connect' button 1201 in at the top of the example image enables the user to connect using Facebook's Open Graph API, as a source for taste graph interests.

A 'Refine 1001' button at the center of the bottom tab panel is provided leading to a list of taste graph interests that the user can modify.

XI. TEXT DATA PROCESSING

For the purposes of explaining the System 100 design, subtitles will be used as the example data source because they provide 'chunks' of text with associated timestamps. Data can also be supplied by a content provider's API or through voice recognition software, in which case the System 100 follows the same methodology except that it considers the complete body of text as a text 'chunk'.

The timestamp for subtitle data is not the time that the Capture Platform 110 receives the text, but the timestamp that the source defines. For subtitles the Coordinated Universal Time is used to identify when the word or words appeared on screen.

In addition to the text data subtitles also provide encoded data, by using color to represent different speakers and text markers for non-text actions such as [APPLAUSE], [LAUGHTER], [TRANSLATION], etc.

Subtitle text in particular is prone to errors in the initial translations, as are Optical Character Recognition (OCR) and voice recognition processing. Or if delivered Over-the-air 203, original signal corruption can cause errors in initial translation.

Figure 6:
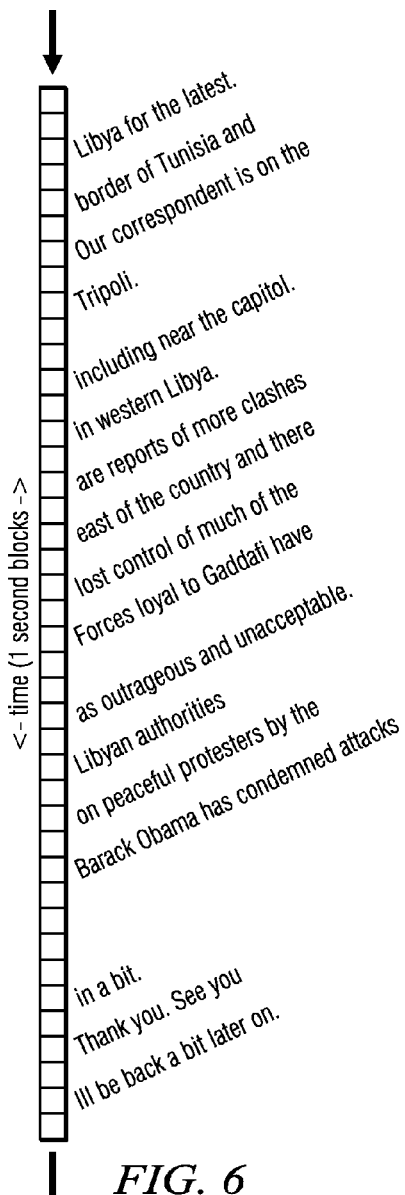
FIG. 6 is an illustration of an example of the physical division of Data Stream Chunks.

This incoming text chunks can be visualized as a stream, as shown in FIG. 6

A. Source

Context of the data source is also received by the System 100, including:
  Source Location (US, UK, Global, etc.)
  Source Description, including, when available:
    Text Title and Description of channel or item
    Timing Information: Duration, Start Time, End Time (as is the case for television programs)
    Content Rating: i.e. Adult, Violence, etc.—in the MediaRss "media:rating" specification format
    Source Category: News, Entertainment, Sports, etc.
  Context/Tags (API provided content)
  Language B. Supporting Data Sources To help in the process, additional information is supplied:
  Dictionaries: to provide a look up source context information
  Nielsen Data: to provide additional program context, demographic, and rating information
  Online Resources: Available online resources are used to generate dictionary content (DMOZ, Y! BOSS, Amazon Alexa API)
  EPG Data & Feeds: Ad Break Timings, Extended (commercial) feed (e.g. Actors, Genre, etc.) are used where available for the source.

C. Text Input Architecture

Although each text chunk is associated with a number of parameters (e.g. source channel, location, etc.), the implementation does not require that this information be explicitly passed from the Capture Platform 110 to the search platform 120.

The System 100 can use source IDs and timing data combined to reduce the amount of data encoded directly alongside each text chunk that is passed to the search platform 120. And therefore, reduce processing needs and resource consumption.

D. Outputs

This process outputs segmented topics that contain the complete text of the topic, a start and end time, and additional classification information. This additional classification data can include the primary topic and weighted categorization data such as location, people, organizations and keywords related to the topic.

XII. PROCESS

Figure 7:
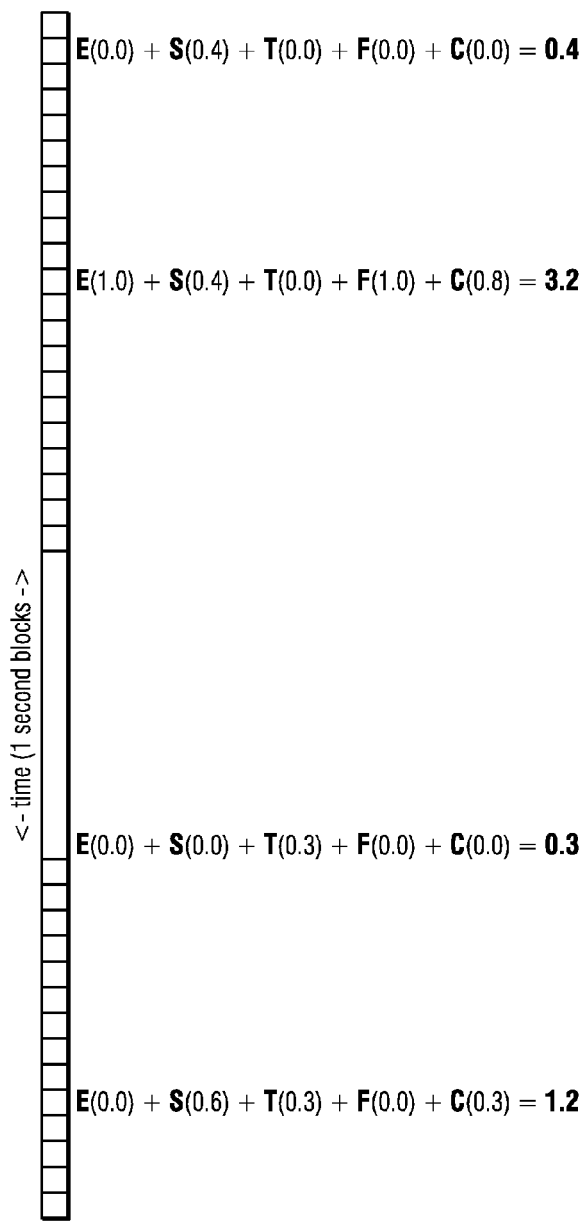
FIG. 7 is an illustration of timing values as a stream of calculated confidence values.

As illustrated and previously discussed with respect to FIG. 2, Incoming text is processed in a series of queues, or buffers, for semantic analysis and processing. The sections that follow describe these processes with further reference to FIGS. 6, 7, and 8. In the context of FIG. 2, the below describing word tokenization (step 1), categorization (step 2), and sentence extraction (step 3) are generally performed in the Text Decoding Server 208, whereas the remaining steps are generally performed in the Topic Extraction & Segmentation component 212 in conjunction with its reference to the contextual database. The application of this methods to system elements described here can be implemented according to system design techniques with knowledge of the relevant design needs in a particular implementation.

A. Step 1: Word Tokenization

Text 'chunks' are divided into individual words.

Tokenization: Latin alphabet derived languages may be tokenized by whitespace and punctuation (period/full stop) separation. Other languages vary. For example, in Modern Japanese and Chinese no white space separation exists, and Arabic words are often a conjunction of several sub-words.

1. Stemming:

Where applicable, stemming algorithms are applied to the source words. The basic function of a 'stemming' algorithm is to enable matching of words based on their root, for example, a stemming algorithm extracts the root word "connect" from the words "connected, connecting, or connection." Numerous algorithms are available across a broad language base.

Phonetic stemming can also be applied to compensate for errors in the text, in particular when the text is derived from a voice recognition mechanism. Phonetic stemming compensates for language irregularities by providing word alternatives based on the source word's phonetic structure. For example, it will match "see" with "sea" and "through" with "threw."

2. 'Stop Words':

These are words which should not be indexed, such as in English: for, of, at, a, and, the, etc. These words are not removed from the buffer, as they form part of the semantic analysis for categorization later in the process, but they are not considered when determining a sentence's context. Instead, these words are flagged as stop words and are ignored when looking for context.

3. 'Parts of Speech' Tagging:

The incoming text is processed and words are marked with their assumed 'part of speech' such as noun, verb, adjective, etc. Detected nouns are of particular interest to the System 100 later in processing, as potential sources of context information such as locations, people, and organizations. These words are usually the best indicators of a text stream's context.

TABLE 1

Text Buffer After Tokenization

| TIME | WORD | STEMMED |
| --- | --- | --- |
| ... | | |
| 1:01:24 | Gaddafi | gaddafi |
| 1:01:24 | . | — |
| 1:01:33 | We | — |
| 1:01:33 | report | report |
| 1:01:33 | from | — |
| 1:01:33 | The | — |
| 1:01:33 | Libyan | libya |
| 1:01:33 | capital | capital |
| 1:01:33 | . | — |
| 1:01:37 | Muammar | muamar, muammar, muamer, meuamer |
| 1:01:37 | Gaddafi's | gaddafi |
| 1:01:37 | tanks | tank |
| 1:01:37 | Are | — |
| 1:01:37 | ready | — |
| 1:01:37 | outside | outside |
| 1:01:37 | The | — |
| 1:01:37 | western | west |
| 1:01:37 | town | town |
| 1:01:37 | Of | — |
| 1:01:37 | Zawiya | zawiya |
| 1:01:37 | . | — |
| 1:01:41 | Preparing | prepar |
| ... | | |

B. Step 2: Categorization

Dictionary look ups are performed to create an extended graph of associated topics with source tokens:

1. Morphologic Dictionary Lookup:

The basic description of this process is that words are matched against a database of morphologically related words. For example, "airplane" is related to "aircraft," "fly" ("flying"), "passenger," "pilot," "airport," etc.

2. Assumed Relationships Dictionary Lookup:

In addition to the more explicitly defined relationships in the Morphologic dictionaries, a database of more loosely coupled relationships is maintained and updated as text is received. This dictionary provides a further source of related data for each of the word tokens.

This dictionary is generated by storing relationships between nouns identified in the parts of speech tagging process. For example, the English sentence, "In Brazil, the famous carnival has begun in Rio," leads to associations where "Brazil" is related to "Carnival," "Rio"; "Carnival" is related to "Brazil," "Rio"; and "Rio" is related to "Brazil," "Carnival". In this way, important information containing multiple words is not discarded or sectioned into unrelated topics.

This helps the System 100 to recognize that the context of a topic has not changed between one sentence discussing "Rio" and the next that mentions "Brazil".

3. Categorization Dictionary Lookup:

This lookup attempts to assign categories from predefined database lists. This data is used:

To apply context: Such as associating "goal" and "football" with "sport," "rain" with "weather," "Elvis" with music, etc.

To assign categorization: for example "Lady Gaga" is a "Person" in "Music"; "Apple" is an organization, "Libya" is a "location".

To augment data:

For example, in location based lookups, "London" can be expanded to "Location," "London, England, United Kingdom, Europe".

A good example is a location based lookup, where "London" can be expanded to "Location," "London, England, United Kingdom, Europe". Rather than pure nouns, keywords such as: "scored" can also be used.

Other lists include:

Places (as described)

People (Celebrities, Authors, Actors, Musicians, etc.)

Organizations (Microsoft, IBM, Verizon, etc.)

Events (Christmas, Summer, War, Famine, Drought, Concert)

Media (books, songs, films, games, etc.)

Objects (animal, vegetable, mineral—although crossover exists with morphological database)

Dictionaries are assumed not to be complete and only serve to help the categorization process. These dictionaries are generated by analyzing taste graphs (as described later) for popular terms and by gathering information from available sources. Online resources and search tools such as DMOZ, Yahoo! BOSS, Amazon Alexa API, and others are used as data sources for dictionary generation.

The functionality of these dictionary lookups includes:

4. Weight/Confidence:

As we categorize tokens with associated topics, we assign weight or confidence values that define how important we believe a word to be.

The base of this weight or score is the count of historic mentions of an expression on a channel. For example, if CNN mentions Obama a thousand times a day, and President Karzai 30 times, then given the sentence "Obama met with President Karzai today," we would assume President Karzai to be the dominant topic of the sentence and as the sentences are combined, the discussion as a whole.

The weighting algorithms are also driven by dictionary source. For example, a location dictionary result is weighted higher than a result from context relationships dictionaries, such that we can say the sentence "In London David Cameron met political leaders for talks" is strongly weighted/almost certainly about London and the UK and probably related to David Cameron and by association, politics. In addition to this dynamic collection of previous mentions, we also draw on the related metadata 5. Stream Context:

As each sentence is processed (sequentially as they arrive), these confidence values are aggregated to provide a dynamic set of keywords and related contexts that define what we believe the most important keywords are and the current context of the conversation. In addition to the identified entities, we also gather context from.

Source Program Data:

Where available, inbound data may also be tagged with context such as "News," "Sport," "Entertainment," etc. Such is the case for much of the API provided content. For broadcast content, over-the-air 203 or commercially supplied EPG data can be used to provide categorization and context information.

External sources:

In particular, broadcast content uses Nielsen data as an additional source for categorization. Commercial EPG data feeds are also available; some even define advertising break schedules.

Recent Stream Topics:

For example, a text stream with mentions of "goal" and "football" would lead to a strong weighting towards a context of "sport". As additional tokens are processed, a dictionary lookup for "Liverpool" is more weighted towards Liverpool the football club, as opposed to Liverpool the city.

6. Stream Context:

As data is received and categories assigned, the context of the stream is identified. This context is gathered from:

Source Program Data:

Where available, inbound data may also be tagged with context such as "News," "Sport," "Entertainment," etc. Such is the case for much of the API provided content. For broadcast content, Over-the-air 203 or commercially supplied EPG data can be used to provide categorization and context information.

External sources:

In particular, broadcast content uses Nielsen data as an additional source for categorization. Commercial EPG data feeds are also available; some even define advertising break schedules.

Recent Stream Topics:

For example, a text stream with mentions of "goal" and "football" would lead to a strong weighting towards a context of "sport". As additional tokens are processed, a dictionary lookup for "Liverpool" is more weighted towards Liverpool the football club, as opposed to Liverpool the city.

7. Multiple Word Nouns:

Each of the dictionary lookups described includes support for multiple word associations. For example, if the word "European" in the token buffer is followed by "Union," a stronger weight is applied to the complete results, as opposed to either word individual word.

Unlike a filtering process, weighing is applied so that a result of "Middle East Politics" does not nullify results for "Middle East". When a query is made against the index for "Middle East Politics," the higher match ensures a higher ranking for the more complete match in the results.

8. Definite Articles and Capitalization:

According to individual language rules, the dictionary is structured to support passing preceding word types, to assist in distinguishing between "Beatles" and "The Beatles". Although correct capitalization cannot be assumed, capitalized nouns also play a role in result weight. For example, organizations and places are capitalized: "Apple" and "apple," "middle east," "Middle East".

TABLE 2

Table Representation of Buffer Data After Lookup

| COUNT | TERM | STEM | MORPHOLOGIC | ASSOCIATION | CATEGORY |
|---|---|---|---|---|---|
| 1 | Muammar Gaddafi | | | {Libya, 0.823} | {People: 0.821} |
| 2 | Gaddafi | gaddafi | | | {People: 0.721} |
| 1 | Muammar | muamar, muammar, muamer, meuamer | | | {People: 0.651} |
| 1 | Tanks | tank | {soldier, 0.631}, {cannon, 0.331}, {enemy, 0.831}, {military, 0.731}, {fire, 0.331} | {war, 0.732}, {Libya, 0.234}, {Afghanistan, 0.436} | |
| 1 | outside | outside | | | |
| 1 | | west | | | |
| 1 | Town | town | city | | |
| 1 | Zawiya | zawiya | | {Libya, 0.913}, {Muammar, 0.323}, {Gaddafi, 0.223} | {Location: {0.921, ["Libya," "Maghreb," "North Africa," "Africa"]} |

C. Step 3: Sentence Extraction

The next stage of processing is to divide the token stream into sentence blocks. This is performed by using a separate segmentation process. The function of this segmentation process is to provide the best match for sentence or topic start/end times.

Similar to the token stream, at the core of the segmentation process is a buffer of time values and confidence values. These confidence values are weights are further illustrated in FIG. 7.

These confidence weights are generated using a number of indicators:

1. Syntactic Indicators 801:

Many languages define a period (e.g. Modern Latin derivatives, English, Japanese, Chinese, etc.) to denote the end of a sentence structure. In English, capitals commonly indicate the beginning of a sentence. Care should be taken towards exceptions such as periods after abbreviations.

2. Timing Indicators 802:

In the case of subtitle information, pauses in the source text timestamps indicate pauses in original spoken words. This information is vital to determining the source chunk length of a subtitle source.

TABLE 3

Example Timing Data

| TIME | TOKEN |
|---|---|
| ... | |
| 0:00:00 | And |
| 0:00:02 | In |
| 0:00:02 | London |
| 0:00:02 | today |
| 0:00:02 | , |
| 0:00:02 | There |
| 0:00:02 | Were |
| 0:00:06 | Riots |
| 0:00:06 | . |
| 0:00:09 | Protestors |
| 0:00:09 | marched |
| ... | |

The System 100 recognizes that the 3 second gap between "riots" and "protestors" is more significant than 4 second gap between "were" and "riots," simply because the combined chunk sentence, "in London today, there were" would have taken longer to say.

3. Source Timing Patterns 803:

Many television sources can be assumed to follow a programming pattern. Content is traditionally delivered in 15, 30 or 60 minute blocks, so that the 0, 15, 30 and 45 minute markers of every hour are weighted as possible indicators of context change.

4. Source Sentence Length 804:

Historic data and language is analyzed to provide an expected phrase length generated for each source. This is a weighted value, stacked to prevent obvious failures like 60 word sentences, and does not assume speakers will follow a strict speech pattern.

5. Text Encoded Data 806:

In addition to the actual text, subtitles contain additional information, such as:

Color: generally used to distinguish between speakers, indicating a change in sentence.

Explicit speaker definition, followed by a colon; e.g. "Charlie: . . . "

Non-text activity (often capitalized and/or in square brackets such as "[LAUGHTER]," "[MUSIC]," "[APPLAUSE]".

Changes in speaker or non-verbal activity are used as indicators for natural sentence breaks.

6. Source Defined Data 805:

EPG data provides explicit program start and end times to use for start and end time definition.

Note: some programs overrun and pre-roll credits.

Some data, such as that provided by Content API 408 Providers such as Reuters and Associated Press, is delivered as a segmented block with a single 'published' time, which acts as the start, end and content time. In these instances, sentence extraction is not required, the article acts as a single already defined topic.

7. Extended EPG Data 807:

Advertising break timings are used when available.

8. Expression Dictionary 808:

Expressions are defined, on a per channel basis, to mark start and end expressions. Expressions beginning with: "Now on . . . ," "Hello . . . ," "Next . . . ," "Welcome to . . . ," "The Headlines:," etc. are a good indicator of a segment beginning, while expressions such as " . . . back later," " . . . Goodnight," etc. are a good indicator that a segment has come to a close.

9. Audio/Video Analysis 809:

Algorithms to process video scene change are available as part of key frame generation routines in many video encoding implementations. Audio analysis is cheaper in terms of processing power, and a sudden change in volume can be used to indicate a change in context. Sudden audio adjustment is a particularly common feature of broadcast advertising and can be used to guess when a television program has ended and commercials have begun.

TABLE 4

Simplified View of Break Indicators

| TIME | WORD | COLOR | BREAK INDICATORS |
|---|---|---|---|
| ... | | | |
| 1:01:24 | Gaddafi | blue | Capitalized |
| 1:01:24 | . | blue | End Marker |
| 1:01:33 | We | yellow | Follows Color Change, Follows Period, Capitalized, Follows Pause [9 secs, 1 word] |
| 1:01:33 | Report | yellow | |
| 1:01:33 | From | yellow | |
| 1:01:33 | The | yellow | |
| 1:01:33 | Libyan | yellow | Capitalized |
| 1:01:33 | Capital | yellow | |
| 1:01:33 | . | yellow | End Marker |
| 1:01:37 | Muammar | yellow | Follows End, Follows Pause, Capitalized, Follows Pause [4 seconds, 6 words] |
| 1:01:37 | Gaddafi's | yellow | Capitalized |
| 1:01:37 | Tanks | yellow | |
| ... | | | |

Using this data buffer, the System 100 can divide the incoming text into sentences. An example is given in the table below:

TABLE 5

Example Result of Sentence Extraction

| TIME | SENTENCE |
|---|---|
| ... | |
| 1:01:24 | Residents say it is now quiet after an intense day of fighting with forces loyal to Colonel Gaddafi. |
| 1:01:33 | We report from the Libyan capital. |
| 1:01:37 | Muammar Gaddafi's tanks are ready outside the western town of Zawiya. |
| 1:01:37 | Preparing to take back with brutal force territory lost in recent days to the regimes opponents. |
| ... | |

D. Step 4: Grammar Checking

Sentences are examined and a score generated according to grammatical correctness, based on:

1. Density of Unexpected Characters:

"Now we w&*AS"!## so double the killer delete select all.". Sentences that contain unrecognized tokens containing non-alphanumeric characters—as flagged with a below average grammar confidence score that lowers the weight value of the related contexts and topic in the index so that this entry is less likely to appear as a result.

2. Sentence Length:

Lost data may make end of sentence detection difficult: e.g. missing period characters within the sentence structure. By examining historic channel data, we define average and expected maximum sentence lengths for channel content. As this expected length is reached and exceeded, we increasingly aggressively identify potential sentence break points, using timing data (a pause between expressions), capitalized words and parts of speech tagging (e.g. definite article 'The' followed by noun) to detect a potential sentence break.

3. Formal Grammar Rules:

This step is performed using available libraries, although the effect of the grammar score on the overall topic ranking is related to the confidence in these algorithms. A channel known to adhere less to conventional grammar rules will weigh this category less than a channel known to adhere more frequently to conventional grammar rules. For example, CNN evening news cast will weight this category as more important than say, MTV.

It is expected that many 'valid' spoken text streams will contain colloquialisms and grammatical irregularities, so over-all these checks should not greatly impact the topic relevance weight.

E. Step 5: Sentiment Analysis

Sentences are examined to produce positive or negative sentiment values. Dictionaries are provided to weigh individual words with individual values, with care taken towards modifiers like "not good," "super bad," "very happy" and broader analysis of overall semantic context, "I cannot say I am happy."

The dictionaries that serve the source weight are balanced by context, such that, for example, superlative heavy sports content does not overly dominate the resultant weight (win, score, fantastic goal).

When a topic has been extracted, this sentiment information is aggregated and stored with the topic as the overall sentiment.

F. Step 6: Topic Extraction & Segmentation Component 212

Figure 8:
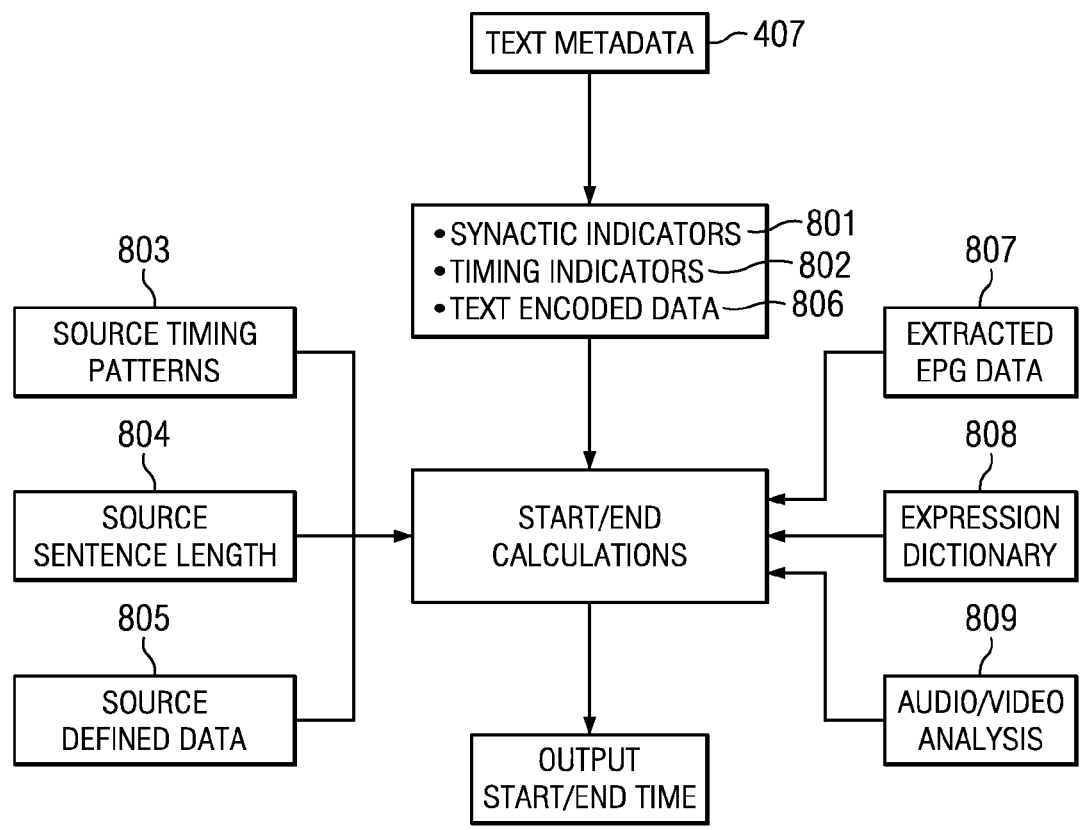
FIG. 8 is an illustration of the combined factors that the System 100 uses to determine a video chunk's start/end time.

FIG. 8 represents the processes by which a clip's Start and End time data is generated.

At this point in processing, the buffer can be said to consist of a series of sentences, each with weighted primary, related keywords and context associated with it.

When a new sentence arrives, it is assigned a unique Topic ID. The sentence is compared to recent/historic sentences and related keywords. The System 100 then determines if the sentence is a match for recent or historic topics. If a sentence is a strong match, it is assigned to a recent or historic sentence Topic ID. If a match cannot be made, the sentence retains its unique Topic ID.

While new sentences are being assigned topics on a sentence level, the buffer contains a series of sentences and Topic IDs that are "waiting" for a change in context. The end Topic ID of the buffer is generated algorithmically, using a number of parameters:

1. Source Defined Timeout:

Depending on the data source and time, topics can be expected to be a certain duration. For example, a news channel might be expected in general to create several 30 second topics at the start of every hour, followed by 10 minute topics for the remainder of that hour. An entertainment program might be expected to produce four 15 minute topic blocks, such as interviews, over the course of an hour.

2. Timeout:

After a period of time passes during which no mention of the original topic or related keywords is made, the System 100 assumes that the discussion of that topic has ended.

3. Topic Category Confidence:

If a topic has a strong confidence in relationship to a particular category and new sentences arrive strongly connected to an unrelated category, this is an indication that the topic has changed to an unrelated subject.

If a series of sentences mention "sport," "football," "goal," "Liverpool," the System 100 has a confidence in 'Sport' as the current context with 'Liverpool, UK' as a location. Should the sentence that follows include "Libya," "government" and "protests," a change in context to news/politics is assumed.

4. Expression Dictionary 808 (Keywords & EPG Data 807):

Sentence extraction will supply heavily weighted 'hard stop' actions. In the news, a sentence beginning with "The Headlines:" is a good indication that the previous topic has ended. Similarly, EPG program start and end timing indicates a topic change. FIG. 8 represents the processes by which a clip's Start and End time data is generated.

Once a topic end has been identified, this completes the process of Topic Extraction & Segmentation 212. The category and related keyword confidence of the topic as a whole is analyzed and combined alongside the aggregated text and start/end times.

Video files are not necessarily physically broken into topic segments in this process. Along with the source channel, the start and end time is sufficient for the Media Storage and Delivery Platform 130 to retrieve and play requested topics. This enables the System 100 to reprocess and redefine topic start and end times without the overhead of cutting and/or merging video files.

G. Step 7: Complete, Segmented Topics

The completed topic is made up of the following data:

1. Source:

Location and channel. Can be defined as a database ID.

2. Program Data:

Title, description, program (adult) rating, category

3. Start/End Times:

The start and end time for the video. In combination with the source (location and channel), this is used to form the content request to the Media Storage and Delivery Platform 130.

4. Text:

The content of the topic

5. Category Information from Dictionary Lookups:

People
Location
Organization
Event
Media: music/book/film/game/etc.

6. Extended Meta Data:

Sentiment
Nielsen Ratings

This data is passed on to a number of processes, including the index for storage, the trending engine and the real-time updates 503 component.

XIII. TRENDING TOPICS

As completed topics are detected, their related keywords are pushed to the 'trending' topics engine, which maintains sets of trending topics. The concept of trending topics or trending stories is one that is widely used, with many active examples online (Breaking News, Twitter, etc.).

The trending engine is a list of query values:

Time: currently trending, last hour, today, last week, last month, etc.

Location: UK, USA, Europe, etc.

Category: Music, Film, News, Entertainment, etc.

Source: Channel or API that provided the trending topic

Each topic generated carries with it not just the active keyword text, but also a confidence score and the accompanying metadata—all of which is aggregated within this engine.

This enables the System 100 to generate rich trending topics lists as sets of query objects, for example in the pseudo JSON format below:

```
[
    { text: 'Mummar Gaddafi,' category: 'People' },
    { text: 'Apple,' category: 'Organisation' },
    { text: 'Libya,' category: 'News,' location: 'Libya' },
    { text: 'Volcano,' location: 'Hawaii' }
]
```

By using this format, when trending keywords such as 'Apple' are queried, only the results relevant to the organization are returned.

A. Filters

Filter lists are applied to trending topics, formed from:

B. Stop Words:

Words that are not relevant to trends:

Non-Important: The stemming routine flags words such as English words 'the,' 'and,' 'but,' as non-important.

Context keywords: such as the word 'sport,' 'business' or 'weather' should not become trending keywords Channel/Source Based words: On CNN, the station may frequently refer to the channel name or anchor names: these words should not become trending results Days of the week: begin to appear as 'breaking' if they are not properly managed.

Frequency analysis of existing data works to prevent these words from becoming trending topics.

C. Admin Override

Allows the Front-End Client 140 Admin Users to temporarily or permanently ban words from the trending topics lists in case a word slips past the frequency analysis algorithm. In this way, the System 100 eliminates words that users would otherwise not be interested in querying.

D. Ranking

Ranking determines the likelihood of an given topic appearing as the result of a user queried search, or of a user seeing a topic in a client's user recommendations. Ranking of a given topic is based on:

1. Frequency Analysis Algorithms:

Frequency analysis algorithms are used to determine trending topics.

2. Trends:

Trends are computed across all sources. Those with broad coverage across multiple sources are ranked higher than those trends discovered on a single source or a limited number of sources.

3. External Sources:

Where Terms of Service allow, external sources are mined and ranking are boosted where matches are found (for example, comparing television trend stories with those on internet news sites.)

4. User Behavior Feedback:

Direct searches and specific user topic selection (clicking on a Topic) combined with algorithm balancing, serve as valuable indicators that a topic is popular. These algorithms may be carefully balanced to ensure that prominently placed keywords do not become self-fulfilling.

XIV. DIRECTED SEARCH

Directed search is the process of providing search results for user queries. These queries can come from text box entrees or by trending topics requests (as opposed to the taste graph search for multiple entries). These queries can be defined as:

A. Query Types:

1. User Input Based:

Which simply means that a user has entered a query for a specific topic, such as Lady Gaga. Processing can include query tokens such as AND, OR, (''), etc.

2. Context-Based:

Searches that contain context information or filters. For example, "location: London" returns only results from London, and in the case of a combination: "riots location:Libya" will return only results related to "riots" in Libya.

One index implementation uses "ElasticSearch," a scalable derivative of Apache Lucene (or its' web enabled sister product Solr). This provides scalability and query processing, but another implementation could be chosen to provide equivalent functionality.

B. Outputs

The result of a search query is a response document containing an array of results. This result format is based on MediaRSS structure and is provided in multiple formats so that the client device can choose the best suited structure (for example, JSON).

Below is a simplified result item sample:

```
item: {
    'id': '12345-12345-12345-12345-12345,'     // System UID
    'timestamp':                                // Last Update Time
    'title': 'Item Title'                       //
    'description': 'Item Description'
    'country': 'GB'                             // ISO '3166-1-alpha-2' Country
                                                   Code
    'mediaGroup': {
    'item': {
        'type': 'video,'        // 'video,' 'stream,' 'article,' etc.
        // Array of rating codes, custom or variation on e.g.:
        // ICRA Ratings: http://256.com/gray/docs/pics/icra.html
        // MPAA Ratings: G, PG, PG-13, R, NC-17, Not Rated
        // ESRB Ratings: EC, E, E10+, T, M, AO, RP
        'ratings': ['NC-17,''M'],
        'categories': ['Obama,''America,'...]   // Equivalent to Topics
        'utc_start': '2000-01-01 00:00:00,'     // Start Time, fixed to
                                                   UTC
        'utc_end': '2000-01-01 00:00:00,'       // Start Time, fixed to
                                                   UTC
    },
    'thumbnail': { }
};
```

XV. TASTE GRAPH MANAGEMENT

This component receives a user's 'taste graph' data and stores it for comparison against video topics. This comparison matches the user with topics first with topics from the existing topic index and second, with the real-time stream of newly created topics as they are received. The user's taste graph combines profile information such as gender, age and location, with other user information such as the user's interests.

Just as categorization is applied to the incoming data for Topic Extraction 212 and video segmentation, the user's interests are also processed to provide equivalent ontological data for search matching.

A. Input

Users are offered the option to connect the application to external networks to import existing taste graph information. Depending on the client program, a user can input profile information, as well as their specific interests. Facebook's Open Graph (formerly Facebook Connect) is the most prevalent example of this, but other available graphs, such as Twitter, LinkedIn, and others, can be used to gather user information.

Figure 9:
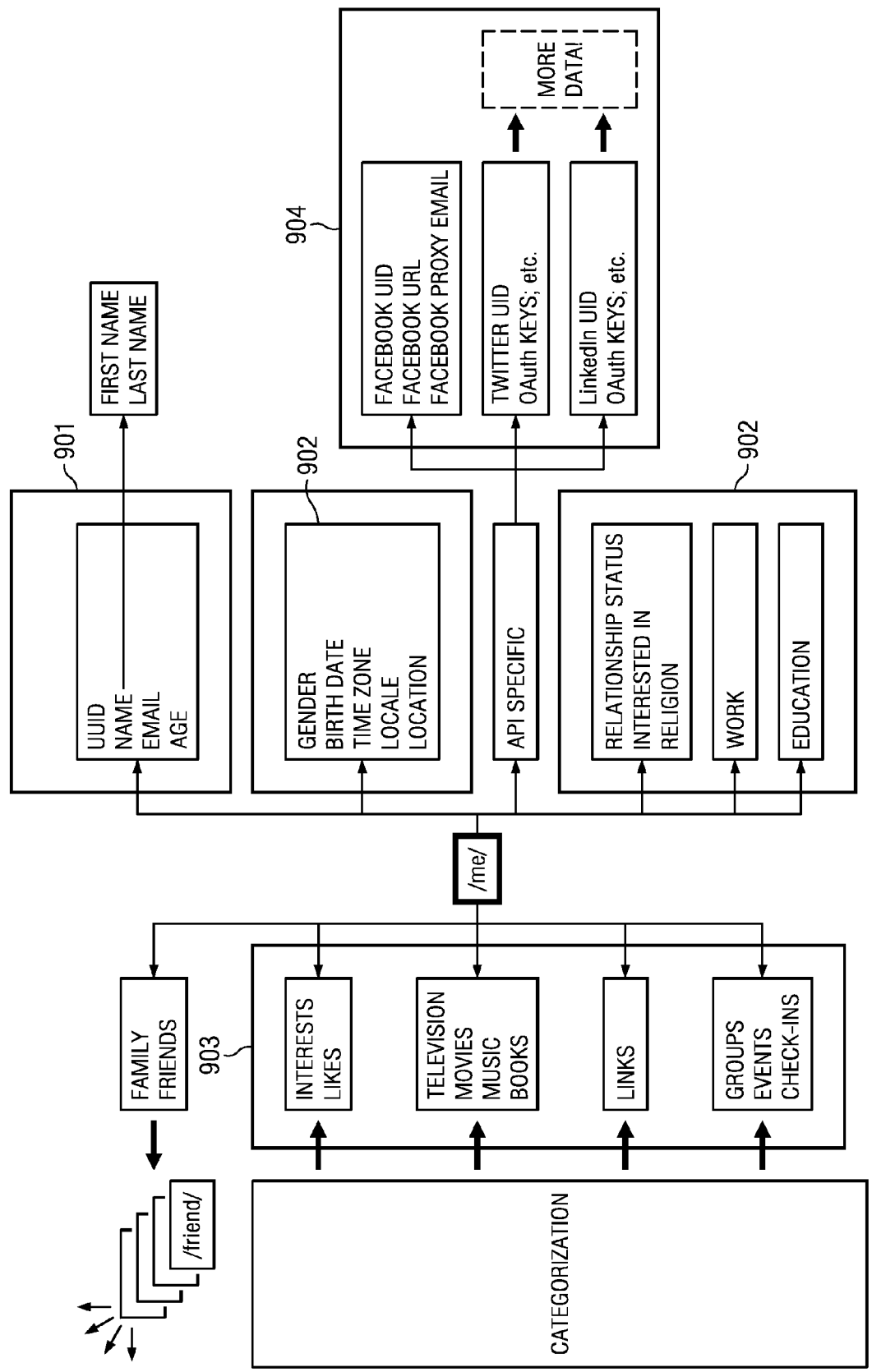
FIG. 9 is an illustration of information that can be gathered from social graphs.

FIG. 9 displays an example of information that can be extracted from an open graph.

B. Process

The System 100 considers three specific data categories for processing:

1. Unique Data 901:

Unique information, such as User ID values, is valuable as part of a user's profile, but may be ignored in the process of topic relevance. Email addresses however are considered a factor when determining a user's interest simply because their sources can be used to determine what kinds of data a user may be looking for. For example, a .edu address may be less likely to be looking for current culture and more likely to be looking for factual information.

2. Discreet Data 902:

Discreet data can be organized into individual sets, such as Age, Location, Gender, and Religion, to form an applicable basis for topic matching. Discreet data may require less preprocessing by comparison than abstract data does.

3. Abstract Data 903:

User profiles may contain interests in the form text keywords such as band names, books, sports, and film titles. Depending on the data source, this information can be supplied with context. Interests such as Books, Television, and Film interests may be separated into specific categories or they may be grouped together.

The System 100 automatically attempts to categorize this abstract data so that user profiles better match an index.

4. API Specific Data 904:

API specific data is data specific to the source of the social graph, for example Facebook User Name, Twitter User Name, etc. This information is not highly value on it own, but it opens a path to yet more information.

C. Preprocessing

Tokenization for interest graphs does not occur in the same way as it does for inbound text. An interest like "Kings of Leon" is taken as a complete expression rather than being divided into individual words. However, in languages where appropriate, definite articles can be stripped for the purposes of the dictionary lookup; however their presence is still noted. For example, an interest in "The Beatles" is queried against the index as "Beatles" but an additional parameter notes the inclusion of the definite article "the" so that a result for the band, rather than the insect, is identified.

D. Dictionary Lookups

The dictionaries used are the same as those used to categorize inbound text from the Capture Platform 110. Sets of common terms from taste graph profiles form a valuable data source in determining popular, out-of-dictionary expressions. The System 100 define the dictionary as providing the following:

1. Context:

"Goal" and "football" are associated with "sport," "rain" with "weather," "Elvis" with "music," etc.

2. Categorization:

For example, "Lady Gaga" is a "Person" in "Music"; "Apple" is an organization; "Libya" is a "location".

3. Additional Metadata & Normalization:

For example in a location based lookup, "London" can be expanded to "Location: London, England, United Kingdom, Europe".

Once these lookups have completed, we are left with basic profile information alongside and an expanded graph of user information.

E. Demographic & Weighting

As with the inbound data, categorization can yield multiple results for individual keywords. Confidence values are applied to each. Because of the scale of data available, processing is assisted by determining a broad demographic for the user. If the System 100 is given the basic information that a user is a 24 year old US male with an interest in sports; the System 100 can quickly provide a set of related topics.

F. Inverted Index

In order to expedite lookup of users from inbound topics (for real-time push), profile data is stored in an inverted index, with topics forming the key to weighted user lists. Instead of serving as the primary data store, this data source is simply used to provide an optimized lookup.

G. Social Graph

In addition to the interests explicitly defined for a user, data relating to the user's social graph of 'friends' or 'connections' is also processed when available. While this data is not the primary indicator of a user's interests, it does form a lower weighted component to be used in determining a user's potential interests. In simple terms, if your friends all like rock music, the System 100 extrapolates that you may like rock music too.

Used exclusively, a user's friends' interests and broader demographic data can be used to generate a subset of 'recommended' topic items that fall outside a user's core interest graph. By representing these items and monitoring the users' explicit and implicit feedback to them (views, ratings, etc.) the System 100 can expand the user's set of interests and broaden the media they are exposed to.

XVI. CUSTOM QUEUE DELIVERY

The taste graph is paired with the index to create a list of relevant results. These results may be from the index database as a whole, or returned according to context (relevant in news, relevant in sport, relevant in music, relevant in a location, etc.).

Results are returned by the Search platform 120 in a result set as described in the Search Box 1006.

A. Infrastructure

When a user first defines their interests, a large quantity of information is processed to quickly return a relevant list of results. Because of this, the infrastructure is optimized to efficiently deliver results using 'big data' database and server tuning techniques. Rather than implementing any platform logic, this sectioning is more a matter of server configuration, and is largely invisible to the platform processing.

1. Disk Segmentation:

At the lowest level, disk usage can be segmented in a Redundant Array of Independent Disks (RAID) configuration to increase performance.

2. Server Segmentation:

The data may also be split across severs to increase performance and redundancy. For the search index, ElasticSearch can be configured in a multiple server configuration, so that queries are processed across a number of servers in parallel.

For the database, a vast majority of database solutions provide support for server clusters and data replication for high volume, high performance data processing. The nature of the data means that it is best suited to a non-relational database structure, which allows for less complex replication processes (compared to RDBMS solutions). As an example, MongoDB provides relatively easily configured replication and storage capabilities suitable for the platform service, but many alternative options are available that may be employed (Cassandra, HBase, etc.)

B. Faceted Search

In order to provide context relevant results, the System 100 uses a search index which provides support for 'faceted search'. This means that the search keyword(s) can be supplemented with additional data to filter results.

There is a connection between this and the 'context' of topics described earlier. For example, a standard search for 'Beatles' may return results for both the band or the animal in equal parts depending on what has more references in the index. In a facet assisted search, with 'music' as the 'facet' (context), only results for the band will be returned.

As described in Topic Extraction 212, additional information provided from various dictionary lookups is added to the index with each topic brought in from the Capture Platform 110. Additionally, taste graph data (the query) is given context in the same way. This provides the index and query facets with additional information for search lookups.

Many search index technologies provide support for faceted search; such as Lucene, and many if its' derivatives (ElasticSearch, Solr, etc.).

C. Caching

Caching occurs on several levels, thus exploiting the relatively cheap cost of storage over the less efficient use of processing power.

API outputs provide cached output data as appropriate, following standard web caching methodologies (e.g. content expiry dates, etags, server side rendered HTML output caching, database lookup caches, etc.).

Both the index and database contain internal transparent memory management & caching to optimize disk IO (in the case of Solr/ElasticSearch/MongoDB and many alternatives.)

By extracting the topic and preforming processing before adding data to the index, the system enables the Search platform to provide more logic driven caching options by creating separated indexes specific to search query types. For example, by knowing the source of content and context of queries, the System 110 can apply different caching rules accordingly: a search for a personality would likely require an up to date, immediate result from un-cached indexes of news content, whereas a search for "Polar Bears" could draw from a cached result.

Custom indexes are also created aggressively, because:
The data, because it is text simply text data, is relatively small in terms of storage.
The processing cost of working across a large index is relatively high.
The content is largely static, not frequently updated, and therefore doesn't need constant processing power.

The indexes are created to satisfy requests by:

1. The User:

As topics are extracted, they are queried against an inverted index of user interests. Topics are then sent to individual user queues to be drawn upon for relevant results the next time a query is made.

To prevent this preprocessing task from growing indefinitely, lists are only maintained for users who have connected to the system within the past 30 days. With this segmentation, an active user's search is passed through their personalized index and filtered according to query terms and facets.

2. Context Segmentation:

Faceted searches provide some efficiency within the index for context-based queries, these can be divided at processing time to provide a single endpoint to client requests, for example to only return results relevant to sports, business news, music, etc.

These examples describe isolated indexes that duplicate data also stored in the core index. The core index is a single index of all topics that is queried when a suitable smaller pre-cached index is not available. In essence, the core index is a master index of all information stored in the system, while isolated indexes are smaller, more specific indexes based in trending topics.

D. Related Content:

When a user is reviewing a video, they may wish to view 'related items' for that clip. In this case, the topic and context of each video can be used in place of the user's taste graph to retrieve and deliver related results.

E. Recommendations:

In effect, the custom queue itself can be said to be a list of recommendations based on the users' interests. This concept is extended to include the interests of their friends, which may not overlap with the users' core interests, but is assumed to be loosely relevant.

F. Queue Ranking:

The queue offers options to client implementations to choose different options for ordering a result list:
Time: Prioritize recent results (strictly or loosely)
Relevancy: Prioritize the most relevant results
Context Spread: With each result set, include a mixture of contexts, for example: some news, entertainment, sport, etc.

Relevance is determined by topic and interest confidence matching and is driven by Lucene, or an alternative search engine's, native relevancy mechanisms.

XVII. VIDEO SEGMENTATION

In general, physical segmentation of video clips is avoided, to allow modification of the clip timings at a later date: segmentation is logical and does not produce physical file changes. Topic start and end times are stored and delivered to the client with the topic data, which then sends them to the Media Storage and Delivery Platform 130 where long form files are read and the appropriate wrapper placed around the Text Topic Data and Video Data.

The separation between the Media Storage and Delivery Platform 130 and Search platform 120 is apparent here.

Incoming video is delivered to the Media Storage and Delivery Platform 130 in continuous chunks, such as 24, 1 hour videos each day. These videos are stored in a way that enables lookup based on the content source and timing information.

At the same time, the Search platform 120 extracts Topic IDs and stores them in the Index of TV 215 along with their timing information. This timing information is encoded to the UTC time, so regional time zone variations do not need to be considered. Topics returned to the client, such as search results or matches to a user's taste graph, contain start and end time information for the topic, which is passed to the Media Storage and Delivery Platform 130 when the user requests playback.

Additionally, the channel name should be considered as a token, so where the channel name might be 'CNN' in practice, the actual disk structure may follow a wider pattern to differentiate between 'CNN-International,' 'CNN-HD' and/or provide character formatting to compensate for file system restrictions on non-ASCII characters.

For example, if the client needs to access a video item, such as a specific interview with Barak Obama, the Media Storage and Delivery Platform 130 is delivered the topic source, the topic start time, and the topic end time:

```
{
    location: 'USA,'
    channel: 'CNN,'
    start: '2011-01-01 17:12:22,'
    end: '2011-01-01 17:13:54'
}
```

Using this information, the Media Storage and Delivery Platform 130 understands that the required video file is at the location:

/uk/cnn/2011-01-01 17:00:00

The platform also understands to start playback 12 minutes and 22 seconds into the video block and end after playing for the video 1 minute and 32 seconds. This is a good example of the process. In practice, the actual processing is slightly more complex, as multiple video files may be involved (if a request spans more than one file) in which case the streaming server compensates by combining two files into an output.

There is another exception to this process, where the delivery server cannot provide dynamic streaming, for example Wowza Media Server delivers H.263 encoded 3gp videos, the Search platform 120 can queue a Delivery Platform API request to pre-encode content to the required format, so that the Media Storage and Delivery Platform 130 will deliver a specific pre-encoded video file (continuing the example above, "/uk/cnn/2011-01-01 17:12:33.3gp").

XVIII. GLOSSARY OF TERMS

API (Application Programming Interface):

An API is a source code-based specification intended to be used as an interface by software components to communicate with each other. An API may include specifications for routines, data structures, object classes, and variables.

CDN (Content Distribution Network):

A Content Delivery Network is a system of computers containing copies of data placed at various nodes of a network. When properly designed and implemented, a CDN can improve access to the data it caches by increasing access bandwidth and redundancy, and reducing access latency.

Redundancy:

Redundancy within a computer network means that multiple versions of a single piece of data exist in multiple places across a network. This is useful because it means that a program searching for this information is more likely to find it, needs less bandwidth to continue its search, and, in the case of damage to a physical server, the data isn't truly gone because other copies of that data exist elsewhere.

Client:

Client, at least in the context of this document, is meant to indicate a program that interacts with the main Real-time Delivery of Segmented Video, but is not a part of it. A client can be can be anything from a mobile phone app to a web-based user interface. For the most part, clients are used by users to access the database and retrieve data.

Client Devices:

A Client Device is any device that runs a client program, such as an Apple Iphone, an Android capable phone, or a TV with IPTV capabilities.

Cloud:

Cloud infrastructure or simply "the cloud" is a system of data organization in which pieces of data are scattered across a network of physical servers. These servers can be pretty much anywhere in regards to their physical location, but are all linked by a common cloud network. Cloud infrastructure has many benefits, including a massive capability for redundancy, a capability to store and efficiently use local and regional data, and a network that will lose little data in the case that a physical server is damaged.

DVB (Digital Video Broadcasting):

DVB is a suite of internationally accepted open standards for digital television. DVB standards are maintained by the DVB Project, an international industry consortium with more than 270 members, and they are published by a Joint Technical Committee (JTC) of European Telecommunications Standards Institute (ETSI), European Committee for Electrotechnical Standardization (CENELEC) and European Broadcasting Union (EBU).

EPG (Electronic Programming Guide):

EPG provides users of television, radio, and other media applications with continuously updated menus displaying broadcast programming or scheduling information for current and upcoming programming.

Function:

Function, at least in regards to the context of this document, is used to describe any task that a program or a component of a program is designed to do. For example, "The Capture Platform 110 provides a number of functions:" simply means that the Capture Platform 110 has the capability of performing a number of tasks.

IPTV (Internet Protocol Television):

IPTV is a system in which television services are delivered using the Internet or a similar wide-scale network, instead of using traditional terrestrial, satellite signal, and cable television formats.

JSON (JavaScript Object Notation):

JSON is a lightweight text-based open standard designed for human-readable data interchange.

Line 21:

Line 21 (or EIA-608) is the standard for closed captioning in the United States and Canada. It also defines Extended Data Service, a means for including information, such as program name, in a television transmission.

Long-Form Video:

Long-Form video at least within the context of this document, simply refers to video data before it has been processed. The actual length of the video may vary, but in most cases it can be assumed to be about the length of a television show or movie.

Media RSS:

RSS, originally called RDF site summary, is a family of web feed formats used to publish frequently updated works. Media RSS simply refers to an RSS feed that is used for media.

OCR:

Optical character recognition, or OCR, is the mechanical or electronic translation of scanned images of handwritten, typewritten or printed text into machine-encoded text. This conversion is used by the System 100 to translate close captioned text into a form that the Search Platform 120 is capable of reading.

RAID (Redundant Array of Independent Disks):

RAID is a storage technology that combines multiple Physical storage servers so that they function as a single unit. This single unit, known as a Logical unit, doesn't require that the servers be physically close, only that they are linked by a network. Data is distributed across the drives in one of several ways called "RAID levels," depending on what level of redundancy and performance (via parallel communication) is required.

Relational Database Management System (RDBMS):

RDBMS is a Database Management System in which data is stored in tables and the relationships between the data are also stored in tables. The data can be accessed or reassembled in many different ways without requiring that the tables be changed.

Representational State Transfer (REST):

REST is a form of software architecture for distributed hypermedia systems such as the World Wide Web. REST style architectures consist of clients and servers. Clients send requests to servers; servers process requests and return appropriate responses.

Social Graph:

A social graph is a collection of data points that represent a person's interests and how those interests interact. Social graphs can be expanded to include information about a group of people or about a group of interests shared by multiple people.

Topic:

A topic, according to this system, is a basic description of a chunk of video. The topic can be broad, such as "Sports" or "News" or specific, such as "Lady Gaga" or "Bill Gates." A chunk of video can have as many topics as is required to describe it. These topics are what the search platform 120 looks for when it attempts to find relevant videos to a search query.

User:

A user is anyone using the System 100 or one of its clients.

XIX. SUMMARY

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Network may also refer to a communication medium between processes on the same machine. Also as referred to herein, a server is a machine deployed to execute a program operating as a socket listener and may include software instances.

In all descriptions of "servers" or other computing devices herein, whether or not the illustrations of those servers or other computing devices similarly show a server-like illustration in the figures, it should be understood that any such described servers or computing devices will similarly perform their described functions in accordance with computer-readable instructions stored on a computer-readable media that are connected thereto.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A video capture and search system operable to capture live video content and make the video accessible through a user search interface, the system comprising:

a video capture server connected to a video source, the video capture server operable to receive video signals from the video source and convert the video signals into a standardized format prior to processing;

an initial processing server in communication with the video capture server, the initial processing server operable to receive the captured video signals from the video capture server and separate and sort the incoming data to provide at least video files for further processing and storage and associated text files for further processing;

a topic extraction server in communication with both the initial processing server and a source of secondary data, operable to receive the associated text files and perform contextual topic extracting and processing to provide additional searchable contextual information and to store the searchable contextual information and place this information, along with the original text files in a searchable database archive, the stored information being associated with the stored video files; and a search platform operable to access the searchable database archive and, either in response to user taste graphs or user inputted search information, to provide a listing of relevant video files, wherein the secondary data comprises Nielsen data, other TV audience data, and/or EPG data and enables the providing of additional searchable contextual information, wherein the contextual topic extracting involves at least resolving potential ambiguities within the original text files, and wherein the topic extraction server is operable, at least in part through use of the secondary data, to detect topics that are trending on the video source.

2. The system of claim 1, wherein the video source is at least one of an over-the-air, Internet Protocol TV, or cable broadcast source.

3. The system of claim 1, wherein the standardized format is an Internet Protocol TV format.

4. The system of claim 1, wherein the topic extraction server is further in communication with a contextual database whereby the topic extraction server is able to perform the contextual topic extraction.

5. The system of claim 1 and further comprising a metrics and trends processing machine which is operable to process the data from the topic extraction server in order to identify metrics and trends in topics being discussed on television, including using the contextual information applied from examination of a contextual database in communication with the topic extraction server.

6. The system of claim 1 wherein the initial processing server is further operable to extract text from the captured video signal using at least one of optical text recognition of elements of the captured video signal and voice recognition of a sound portion of the captured video signal.

7. The system of claim 1 wherein the initial processing server is further operable to process the secondary data associated with the captured video signal to further supplement the text it associates with the captured video signal.

8. The system of claim 1 wherein the search platform includes a front-end user interface through which a user can interact with and search the searchable database archive and the stored video files and thereby find stored video files according to the user's search terms or stored user profile.

9. The system of claim 8 wherein the search platform is further operable to create a queue of custom selected videos for the user to optionally view.

10. The system of claim 8 wherein the search platform further includes at least one of a trending keywords block, a real-time updates block, a taste graph block, a directed search block, and a feedback block.

11. A video capture and search method for capturing video content and make the video accessible through a user search interface, the method comprising:

capturing in a video capture server video signals from a video source and converting the video signals into a standardized format for processing;

receiving the captured video signals in an initial processing server, where the signals are sorted by format and directed to at least one of a video server, an image server, or a text decoding server for further processing;

processing the captured video signals in the initial processing server to generate video files and associated meta text data to be stored in text files associated with the generated video files;

storing the video files and associated meta text data in respective databases for later searchable access thereto; and processing the meta text data in a topic extraction server, whereby the topic extraction server is operable to perform contextual topic extracting and processing, using data obtained from the initial processing server and secondary data to provide additional searchable contextual information and to store additional contextual information along with the existing meta text data in the searchable contextual information and place this information, along with the original text files in the searchable text database, wherein the secondary data comprises Nielsen data, other TV audience data, and/or EPG data and enables the providing of additional searchable contextual information, wherein the contextual topic extracting involves at least resolving potential ambiguities within the meta text data, and wherein the topic extraction server is operable at least in part through use of the secondary data to detect topics that are trending on the video source.

12. The method of claim 11, wherein the video source is one of an over-the-air broadcast source, cable broadcast source, or Internet Protocol TV source.

13. The method of claim 11, the method further comprising receiving user search requests or personalization through either user interaction with media assets or data obtained through user taste graphs, whereby users can receive personalized video streams and search recommendations and search the video database for contextually correct video clips.

14. The method of claim 11 wherein the initial processing server further extracts text from the captured video signal using at least one of optical text recognition of elements of the captured video signal and voice recognition of a sound portion of the captured video signal.

15. The system of claim 1, wherein the video capture server is a geographically regional, physically deployed server.

16. The system of claim 1, wherein the system further comprises a Taste Graph Processing component in communication with the topic extraction server and a source of user taste graphs, operable to apply real world models to user taste graphs and extrapolate a user's interests to aid in topic extraction.

17. The system of claim 16, wherein the source of user taste graphs is a social media application programming interface (API).

18. The system of claim 1, wherein the secondary data further comprises demographic data.

19. The method of claim 11, wherein the secondary data further comprises user taste data.

20. The system of claim 1, wherein the video capture server, initial processing server, topic extraction server, and search platform are implemented using a cloud based infrastructure.

* * * * *